US011074528B2

(12) United States Patent
Gupta et al.

(10) Patent No.: US 11,074,528 B2
(45) Date of Patent: Jul. 27, 2021

(54) ROBOTIC OPERATIONS CONTROL SYSTEM FOR A BLENDED WORKFORCE

(71) Applicant: ACCENTURE GLOBAL SOLUTIONS LIMITED, Dublin (IE)

(72) Inventors: Kumar A. Gupta, Bangalore (IN); Manisha Dubey, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 860 days.

(21) Appl. No.: 15/783,915

(22) Filed: Oct. 13, 2017

(65) Prior Publication Data

US 2019/0066013 A1   Feb. 28, 2019

(30) Foreign Application Priority Data

Aug. 31, 2017   (IN) .............................. 201711030811

(51) Int. Cl.
*G06Q 10/10* (2012.01)
*G06Q 10/06* (2012.01)
*G06N 5/02* (2006.01)
*G06N 20/00* (2019.01)

(52) U.S. Cl.
CPC ....... *G06Q 10/06311* (2013.01); *G06N 5/022* (2013.01); *G05B 2219/40202* (2013.01); *G06N 20/00* (2019.01)

(58) Field of Classification Search
None
See application file for complete search history.

(56) References Cited

U.S. PATENT DOCUMENTS

| 2002/0112171 | A1 | 8/2002 | Ginter et al. |
| 2012/0155274 | A1 | 6/2012 | Wang et al. |
| 2015/0071053 | A1 | 3/2015 | Kempf et al. |
| 2015/0193872 | A1 | 7/2015 | Ivanoff et al. |

(Continued)

FOREIGN PATENT DOCUMENTS

| CN | 106600722 | 4/2017 |
| CN | 106794581 | 5/2017 |

(Continued)

OTHER PUBLICATIONS

Gokce Gorbil et al; "Storms in Mobile Networks"; Proceedings of the 10th ACM symposium on QoS and security for wireless and mobile networks; pp. 119-126; Sep. 2014.

*Primary Examiner* — Alan Torrico-Lopez
(74) *Attorney, Agent, or Firm* — Mannava & Kang, P.C.

(57) ABSTRACT

A robotic operations control system enables seamless distribution of tasks among a blended workforce that includes human employees and robot assistants. The robot assistants include an intelligent billing assistant (IBA), an intelligent collections assistant (iNCA), a dispute resolution assistant (DRA) and a cash processor. Each of the assistants includes a workflow manager that receives work items to be processed by the robot assistant based on the priority levels assigned to the work items. The IBA includes a dispute prediction model that predicts the likelihood of dispute for a work item and automatically generates a customized checklist. The iNCA includes an AI prioritizing assistant that identifies priorities for work items to be processed. The DRA includes an AI assisted investigator that expedites investigations of disputes by proactively gathering information for a human employee to review and mark the dispute as valid, invalid or for query.

14 Claims, 19 Drawing Sheets

(56) References Cited

U.S. PATENT DOCUMENTS

| | | |
|---|---|---|
| 2016/0044531 A1 | 2/2016 | Papa et al. |
| 2016/0219065 A1 | 7/2016 | Dasgupta et al. |
| 2016/0241429 A1 | 8/2016 | Froehlich et al. |

FOREIGN PATENT DOCUMENTS

| | | |
|---|---|---|
| KR | 20120116308 | 10/2012 |
| WO | WO 2012027888 A1 | 3/2012 |
| WO | WO 2015123836 | 8/2015 |
| WO | WO 2015124326 A1 | 8/2015 |
| WO | 2017091296 | 6/2017 |

ROBOTIC OPERATIONS CONTROL SYSTEM FOR A BLENDED WORKFORCE

PRIORITY

The present application claims priority under 35 U.S.C. 119(a)-(d) to Indian patent application number 201711030811, having a filing date of Aug. 31, 2017, the disclosure of which is hereby incorporated by reference in its entirety.

BACKGROUND

The evolution of artificial intelligence (AI) technologies and related programming tools is enabling machines to work alongside and collaborate with human employees. Many organizations are taking significant strides in this direction by adopting cognitive and AI technologies with their processes. Machines and employees possess different complementary skills in that machines are good in terms of precision and consistency while employees tend to be better at tasks that demand creativity, contextual understanding and complex communications. Therefore, moving a battery of repetitive, tedious tasks to be handled by the machines may have a two-fold advantage for a workforce. Not only can the organization leverage the resulting machine learning to improve the efficiency of the tasks but the employees are also freed up to pursue more challenging tasks thereby raising their skill levels. Many technological challenges exist in developing interfaces that enable the various participants of the blended workforce to seamlessly work together towards improved efficiency.

BRIEF DESCRIPTION OF DRAWINGS

Features of the present disclosure are illustrated by way of examples shown in the following figures. In the following figures, like numerals indicate like elements, in which:

FIG. 14 shows a screen to raise a dispute in accordance with an example.

DETAILED DESCRIPTION

Figure 1:
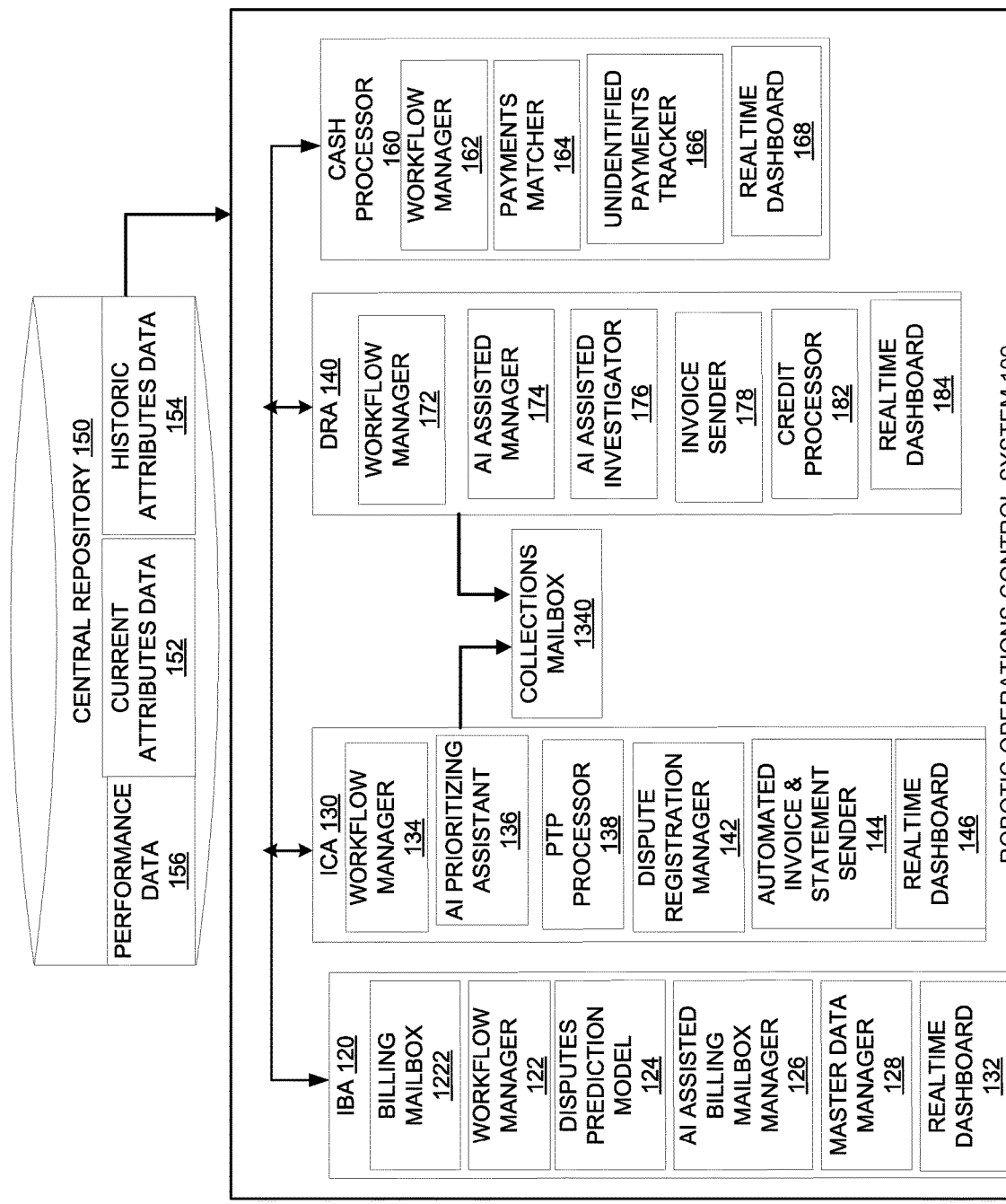
FIG. 1 shows a robotic operations control system that enables operations within a blended workforce in accordance with an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a robotics operations control system that enables a blended workforce including human employees and robot assistants to efficiently carry out tasks is disclosed. The robot assistants can include programming instructions or code that is executed by one or more processors to automatically select and carry out certain tasks within the work flow that the robot assistants may be programmed to handle. While the description is given below with respect to a robotic operations control system for a particular department, it can be appreciated that this is for illustration purposes only and that the examples involved in selecting work items, prioritizing the work items and making predictions as described herein can be equally applicable to other departments where robot assistants may be employed to work alongside human employees.

The robotics operations control system includes various robot assistants such as an intelligent billing assistant (IBA), an intelligent collections assistant (iNCA), a disputes resolution assistant (DRA) and a cash processor. Each of the assistants enables speeding up processes within a certain part of the workflow for billing and collections processes. Each of the assistants includes a respective workflow manager that accesses one or more lists of work items assigned thereto and prioritizes the work items based on the information regarding the work items that is included in current attributes data and historic attributes data of the work items. A work item may pertain to one of a billing matter, a collections matter or a dispute and the current attributes data includes attribute values of the work item. The historic attributes data includes prior values of the attributes included in the work item wherein the prior values are obtained from similar work items that were previously processed by the robot assistants. A central repository stores the current attributes data and the historic attributes data in addition to performance statistics of the various participants of the robotics operations control system. The various participants for whom performance statistics are gathered may include the human employees and the robot assistants described herein.

The work items for the various assistants may be provided from different sources such as electronic mailboxes or pending work lists and the like. The workflow managers in each of the various assistants process the work items in accordance with respective priorities assigned thereto. For example, an electronic billing mailbox that receives emails related to billing matters from within the domain of the robotics operations control system feeds the workflow of the IBA. The workflow manager of the IBA accesses the work items designated to the IBA while an AI based billing mailbox manager processes the work items in accordance with the various request types that the IBA is configured to handle. A disputes prediction model is included in the IBA which employs dispute prediction analytics to identify those work items associated with billing matters that have greater likelihood of being disputed. When a billing matter with a higher likelihood of dispute is identified, a checklist may be generated in order to reduce the probability of occurrence of the dispute. A real-time dashboard also included in the IBA, provides various user interfaces to access the functionality associated with different elements of the IBA while monitoring the progress of the various billing matters.

The iNCA and the DRA share an electronic collections mailbox from which work items are forwarded to be processed by the iNCA and by the DRA. The collections mailbox not only receives internal email related to collections matters and disputes from the domain of the robotics operation control system but may also receive emails from external domains. A workflow analyzer included in the workflow manager analyzes the emails to identify the emails that are to be processed by the iNCA and the emails that are to be processed by the DRA. An AI prioritizing assistant is also included in the iNCA for identifying priorities for work items to be processed by the iNCA using intelligent collection analytics as will be detailed further infra.

Certain work items such as requests for invoice copies and the like are handled automatically by the iNCA without human intervention. The iNCA additionally enables employees such as collection agents to improve efficiency of the collections processes by not only generating automatic priorities but also via automated email indexing, sending out acknowledgements, gathering data to enable the collection agent to make a call to the customer and to allow the collection agent to easily enter relevant post-call information after concluding the call. After the call, the iNCA receives the data obtained by the collection agent from the call and updates the current attributes data of the work item associated with that collections matter. The iNCA also includes a real-time dashboard that provides not only access to the various function of the iNCA that pertain to the processing of the work items, but also provides performance statistics regarding the processing of the collections matters by the iNCA and the employees participating in the robotics operations control system.

The work items pertaining to disputed bills are forwarded to the DRA. When a customer receives a bill for which the customer contends that one or more attribute values are erroneous either via an email, a voice call or other communication modes, the matter is forwarded for processing to the DRA. An employee may call the customer to confirm that the information in the communication is correct and that the customer intends to raise a dispute. The employee may register a dispute after the call and the current attributes data of the billing matter is updated to indicate that it is under dispute. More particularly, the current attributes data may include the precise attributes that the customer contends are in error, identifying indicia for the dispute such as the bill or invoice number, a dispute registration number if any, the date the dispute was raised, the current status of the dispute and the like. An AI assisted investigator is included in the DRA which gathers the information necessary to check the accuracy of the customer's claims and presents the information to an employee. Based on the information obtained from the AI assisted investigator, an employee who is assigned the work item may determine that the dispute is valid, invalid or requires further information. Accordingly, if the dispute is valid, the employee may initiate a process to credit the customer. If the dispute is invalid or requires further query, the employee may respectively reject the dispute or transmit a query for further information. For various communications that employees may need to send to customers, the robotics operations control system may provide communication templates such as pre-made email templates that the employee may quickly customize to suit a situation with values from the current attributes data. A cash processor is also included within the robotics operation control system to receive and send payments, to match received payments to one or more pending bills, track unidentified payments and the like.

The robotics operations control system as disclosed herein uses robot assistants such as the IBA, the iNCA and the DRA that mimic human actions in executing complex tasks that are typically performed manually. The various elements such as the workflow managers, disputes prediction model, automated invoice sender, AI assisted investigator and the like lower operational costs through automatic processing of billing and collections tasks. For example, the workflow managers and AI assisted billing mailbox managers analyze received emails to not only update the current attributes data but also handle certain tasks such as invoice requests or requests for account statements automatically thereby reducing routine tasks for human employees. Elements such as the dispute prediction model enable automatic generation of checklists that are customized to a given bill thereby greatly reducing the likelihood of occurrence of dispute. Consequently, the time and resources that would otherwise have been expended on the dispute resolution are saved. The AI assisted investigator extracts the relevant documents and other details for a human employee examining a dispute thereby saving the time and effort that the employee would have otherwise spent in collecting the required information. Also, the robotics operations control system as described herein can be easily replicated across various geographic locales thereby enhancing the efficiency of a global organization.

FIG. 1 shows a robotic operations control system 100 that enables a blended workforce including human employees and robots including processors to cooperatively carry out tasks associated with retrieving information, analyzing the retrieved information and providing actionable items for the human employees to execute. The robots therefore function as assistants to the employees and aid in varied tasks across the robotic operations control system 100 such as but not limited to, assignment of work items, monitoring or tracking the progress on the processing of the work items, determining dispute probabilities on billing matters or researching dispute data and maintaining performance statistics. The robotic operations control system 100 includes robots or robot assistants such as an intelligent billing assistant (IBA) 120, an intelligent collections assistant (iNCA) 130, a disputes resolution assistant (DRA) 140 and a cash processor 160. Each of the robot assistants include one or more programmed processors which are configured to contextually provide the requisite data to the employees who use the robotic operations control system 100 to handle the various billing or collections matters. The robot assistants are also configured to execute some tasks automatically without manual intervention. The robotic operations control system 100 therefore enables seamless interactions between robot assistants and the employees to execute the various tasks smoothly. In addition to facilitation task, the robotic operations control system 100 tracks the performance of the blended workforce and maintains the performance statistics 156 which can be viewed via the respective real-time dashboards 132, 146, 184 and 168 included in each of the IBA 120, the iNCA 130, the DRA 140 and the cash processor 160.

While the IBA 120, the iNCA 130, the DRA 140 and a cash processor 160 may each have their own databases, the robotic operations control system 100 may include a central repository 150 for data that is required for operation of the sub-systems. The central repository 150 may store current attributes data 152 and historic attributes data 154 of the work items. The current attributes data 152 may include attribute data of currently pending bills or collection matters. Historic attributes data 154 may include attributes of previous bills or collection matters that have been resolved or closed. Moreover each of the robot assistants, the IBA 120, the iNCA 130, the DRA 140 and the cash processor 160 may include a respective workflow manager that automatically prioritizes items on work lists so that the employees are aware of the order in which the work items are to be dealt with and UIs such as real-time dashboards that convey, in addition to other information detailed infra, performance statistics of respective robot assistants.

The IBA 120 handles various matters to be billed in addition to the works in progress with regards to billing and identifying billing matters that have a potential for dispute based, for example, on past history. The IBA 120 includes a workflow manager 122, a disputes prediction model 124, an AI assisted billing mailbox manager 126, a master data manager 128 and a real-time dashboard 132. The workflow manager 122 accesses work items obtained from an electronic billing mailbox 1222 and prioritizes the work items based not only on the current attributes data 152 of the work items but also the historic attributes data 154. By the way of illustration and not limitation, the work items may include new unread emails within the billing mailbox 1222 and also billing matters which may be work-in-progress (WIPs). Examples of the current attributes data 152 may include without limitation, a customer associated with the work item/email, document identifiers such as bill or invoice numbers, the associated invoice amounts, the invoice dates, characteristics peculiar to a matter for which the invoice is generated and the like. The characteristics that are peculiar to the invoice matter depend on the goods or services for which the invoice is generated. For example, if the invoice is generated for a delivered package, the characteristics may include the weight of the package, the distance it was transported, taxes or duties that were paid on the package and the like. Similarly, various goods and services may have their own characteristics that form part of the current attributes data 152. In addition, the current attributes data 152 of a billing matter may depend on the status of the billing matter. As the billing matter progresses towards invoice generation, collections and cash processing, the current attributes data 152 may expand to also include information regarding how the billing matter was resolved. For example, if the bill or invoice was disputed and had to be processed by the DRA 140, then details regarding the dispute such as the characteristics that were disputed and how the dispute was resolved may form part of the current attributes data 152. In an example, the priorities may be set daily not only for an entire billing department but also for each employee who will be assigned the work items. The workflow manager 122 accesses priorities of the work items and match them with the characteristics of members of the blended workforce including robotic assistants or human employees. For example, the members identified within the robotic operations control system 100 may be included in a team matrix 158 which includes information regarding the robotic assistants and the employees. Employee information such as but not limited to, employee name, employee identification, location, overall experience, tenure in the current position, time period that the employee was registered with the robotic operations control system 100, education and skills of the employees, language proficiency, record of successful outcomes and the like can be included in the team matrix 158. Information regarding the robotic assistants such as their functions, outcome statistics and the like may also be included in the team matrix 158.

Based on the information from the team matrix 158, the workflow manager 122 may automatically assign work items to different employees. Generally, the work items may be assigned serially to different employees. However, in some cases where the work items are more complex, they may be matched up with employees having higher education and/or skills or who have greater experience. In some cases a work item may require specialized skills such as proficiency in a particular language as indicated by the current attributes data 152 of the work item. The workflow manager 122 may automatically assign the work item to an employee who is registered within the team matrix 158 as proficient in that language. The employee priorities may be assigned by automatically arranging work items assigned to the employee in a descending order of their departmental priority numbers. The work items that are thus prioritized may be presented to a supervisor in order that they may be assigned to individual employees.

The disputes prediction model 124 can be a statistical model that receives as inputs the current attributes data 152 and historic attributes data 154, analyzes the inputs to estimate the likelihood of dispute in each newly created billing matter. In an example, the likelihood of dispute for each attribute of the bill in the current attributes data 152 is obtained. Based on a comparison of the likelihoods of disputes with predetermined thresholds, a checklist may be automatically generated for the bill. The checklist may include checkpoints or confirmations for values of the attributes of the bill. During the generation process, the bill is run through the checklist for verification of the attributes prior to sending it out to the payer. The disputes prediction model 124 enables proactive action in reducing the occurrence of a dispute thereby saving time and cost.

The AI assisted billing mailbox manager 126 enables increasing the efficiency of the billing process by effectively tracking the completion of requests. When an email which is initially received in the billing mailbox 1222, it is automatically read by the AI assisted billing mailbox manager 126 using, for example, natural language processing (NLP). A ticket is logged and an acknowledgement may also be automatically sent to the requestor. The AI assisted billing mailbox manager 126 obtains other information from processing the email via the NLP techniques to provide for example, the current attributes data 152 including identifying indicia such as an bill number for a billing matter referred to in the email. Based on the current attributes data 152 such as, the type of request, various actions may be initiated by the IBA 120 as will be detailed further infra. The master data manager 128 manages the data generated from the various billing matters such as but not limited to the current attributes data 152 and historic attributes data 154, performance statistics 156 and other data associated with the robotic operations control system 100. The data managed by the master data manager 128 can be viewed by UIs such as the real-time dashboard 132 which lets an employee explore various attributes of a billing matter based of course on the privileges corresponding to the employee's profile with the robotic operations control system 100.

Then iNCA 130 and the DRA 140 may share an electronic collections mailbox 1340 in accordance with an example. This is because, customers may send emails regarding payments, disputes and the like from external domains into the collection mailbox 1340. The iNCA 130 also includes a workflow manager 134, an AI prioritizing assistant 136, a promise-to-pay (PTP) processor 138, a dispute registration manager 142, an automated invoice and statement sender 144 and the real-time dashboard 146.

The workflow manager 134 and the AI prioritizing assistant 136 work in a manner similar to the workflow manager 122 for prioritizing purposes. However, prior to the prioritizing of work items, the workflow manager 134 initially separates emails to be processed by the iNCA 130 and the DRA 140. The workflow manager 134 accesses the emails in the collections mailbox 1340 to analyze if the email needs to be processed by the iNCA 130 or the DRA 140. In an example, a collections matter may be escalated as a dispute which is processed by the DRA 140. Based on the analysis, the workflow manager 134 included in the iNCA 130 may be able to identify if the matter should be processed by the iNCA 130 or the DRA 140. In an example, the robotic operations control system 100 may import the emails daily from the email server to the collections mailbox 1340 included within the robotic operations control system 100 so that the emails are only accessible from the collections mailbox 1340. The iNCA 130 processes work items to enable pre-call activities such as providing information prior to a human collection agent calling a customer based on the information provided by the iNCA 130. Upon completion of the call, the iNCA 130 also processes the work items to receive information exchanged during the call, such as PTPs, in post-call activities. The information thus gathered may form part of the current attributes data 152 which will be accessed for further processing.

Again, the AI prioritizing assistant 136 accesses the work items which may include the emails retrieved from the collections mailbox 1340 and analyzes them to identify priorities for the work items or collections matters for the day. An Accounts Receivables (AR) report may be generated daily which includes the emails received in the collections mailbox 1340 and any pending collections matters that have been flagged for action on a given day. As mentioned above with respect to billing matters, collections matters may also have department-level priorities which are indicated to assigned employees. The employees in turn may access the work items they have been assigned in a descending order of their department-level priorities. In an example, a supervisor may be able to manually configure or adjust the priorities if needed. A PTP processor 138 can be used to register promises to pay made by parties who have outstand bills to be paid. The PTP processor 138 functions in tandem with the cash processor 160 to track payments in accordance with examples discussed herein.

The iNCA 130 may be configured to automate certain tasks necessitated by the work items in an AR report. The automated statement and invoice sender 144 may be configured to access a data store such as the central repository 150 to retrieve the bills. If an invoice is available for a given work item, the automated invoice sender 144 selects the invoice for transmission to the requester. The invoice may be selected based on one or more matching data fields such as but not limited to a transaction number, contact information and the like from the current attributes data 152 of the work item. Similarly, the automated statement and invoice sender 144 may also send out statements for customer accounts in response to requests in the collections mailbox 1340.

There can be a subset of emails in the collections mailbox 1340 disputing invoices that were previously sent. The workflow manager 134 in the iNCA identifies those emails as pertaining to disputes. The dispute emails can be recognized by parsing the email text and using NLP techniques to match the parsed email text with the current attributes data 152. The current attributes data 152 of the work item may contain a transaction number, data such as an invoice number, a case number related to the dispute and the like. The workflow manager 134 may be configured to search for particular data fields or textual patterns such as words, phrases and the like within the emails pertaining to disputes. If the email refers to an existing dispute, the workflow manager 134 may be configured to automatically forward the email for processing to the DRA 140. If the email does not refer to an existing dispute or if no other dispute is registered for the given invoice number or transaction number but the email includes words indicative of dispute, then the dispute registration manager 142 is activated to register a dispute for the given invoice number. In an example, the dispute registration manager 142 may raise a ticket requesting human intervention. This can result in an employee calling the corresponding contact in response to the email and initiating a dispute process.

A workflow manager 172 included in the DRA 140 functions similarly to the workflow manager 122 included in the IBA 120 and the workflow manager 134 included in the iNCA 130 to identify emails or other work items that are to be processed by the DRA 140. An AI assisted manager 174 enables prioritizing the dispute tasks by the DRA 140. As mentioned supra, the priority ranks of the work items in the DRA that are generated each day can be used by an employee assigned to the work items to prioritize his/her work queue. The AI assisted investigator 176 provides documentation relevant to a work item being processed by the DRA 140. In an example, the AI assisted investigator 176 is configured to obtain documents or items from the central repository 150 that enables an employee assigned to the work item to further investigate the dispute and determine the validity of the dispute. For example, if a dispute is logged for the invoiced amount of a bill, the AI assisted investigator 176 may be configured to obtain documents or emails related to the disputed issue. In addition, the AI assisted investigator 176 may be configured to identify a data field under dispute and obtain values of the data field from different documents thereby enabling the employee to determine the validity of the dispute. If the dispute is determined to be valid, the employee may access the invoice sender 178 to send a revised invoice if the bill is not yet settled. If the billed party has already paid the bill and the dispute is found to be valid, the employee may use the credit processor 182 to process the credit to the billed party. If the dispute is determined to be invalid, the employee may automatically be provided with a pre-made template email to send a rejection to the contact associated with the bill. The language in the pre-made template email may be framed based at least on the reason codes of the dispute in one example. In an example, the employee may be provided with a plurality of possible dispute scenarios by the DRA 140. When the employee selects a dispute scenario, the corresponding email template conveying the rejection may be provided to the employee.

The cash processor 160 which also forms a part of the robotic operations control system 100 is used to process the debits and credits associated with the various work items. The work items for the cash processor 160 may not only include documents but may also include cash, checks, credits, debits and the like which are to be processed. When a payment for a bill or invoice is to be deposited or if any credits are received, it can be sent to the cash processor 160. In an example the cash processor 160 may also include a workflow manager 162 that prioritizes items for the day for employees working with the cash processor 160.

A payments matcher 164 is also included to match payments to existing bills/invoices to identify which of the bills/invoices are to be marked as paid. When the deadline associated with a PTP expires, the PTP processor 138 may activate the payments matcher 164 from the cash processor 160 to verify if a payment corresponding to the PTP is obtained. If the payments matcher 164 determines that the bill is paid, then the billing matter associated with the work item is closed. If no payment was identified for the billing matter, then the payments matcher 164 may flag the PTP as withdrawn. The billing matter may then be processed by the workflow manager 134 of the iNCA 130 in accordance with examples discussed herein. An unidentified payment tracker 166 which also forms a part of the cash processor 160 can be used to track and identify a party/invoice that a payment is directed to. The tracking may occur based on an account number, invoice number, client id and the like.

Figure 2:
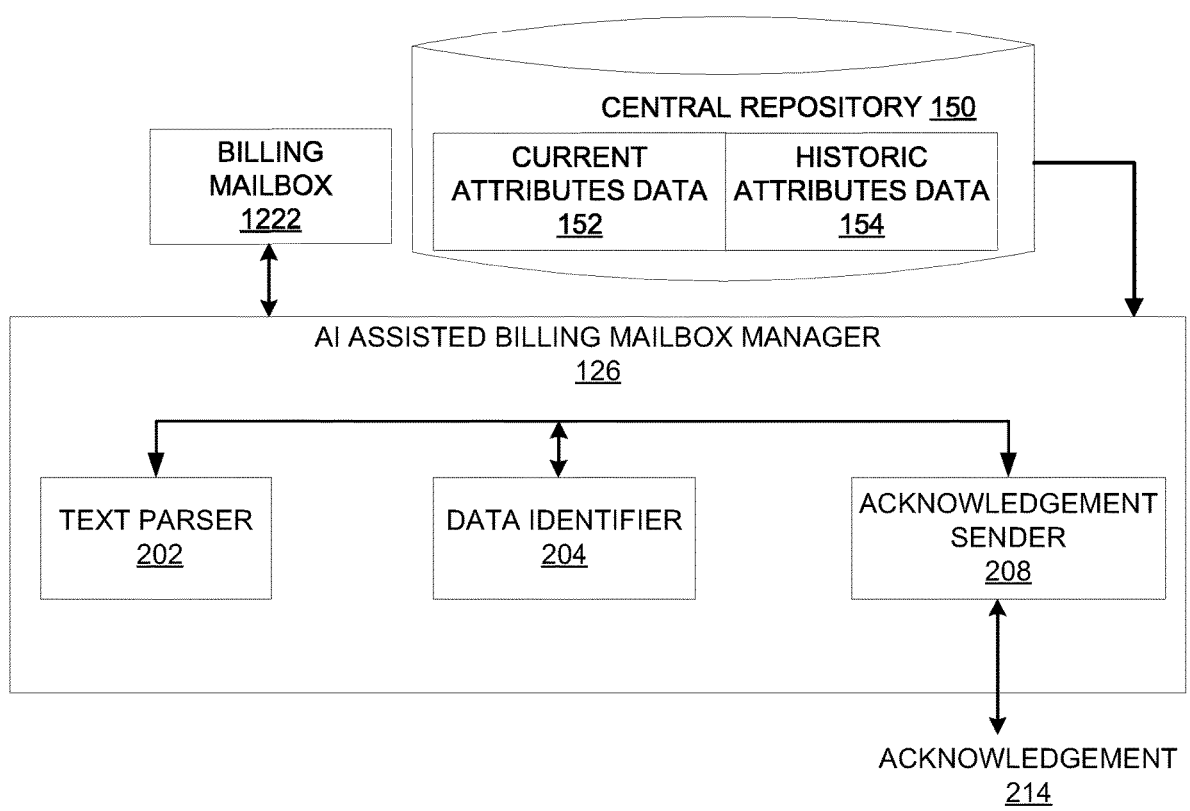
FIG. 2 is a block diagram of an AI assisted billing mailbox manager in accordance with one example.

FIG. 2 is a block diagram of the AI assisted billing mailbox manager 126 in accordance with one example. The AI assisted billing mailbox manager 126 analyzes emails from the billing mailbox 1222 to identify a type of request included in the email and generate an appropriate response in accordance with examples discussed herein. The AI assisted billing mailbox manager 126 accesses an email, logs a ticket and automatically sends an acknowledgement 214 to the requestor by the acknowledgement sender 208. A text parser 202 included in the AI assisted billing mailbox manager 126 parses the email text to generate word tokens. The word tokens may be further processed to remove spaces, stop words, punctuation and the like. A data identifier 204 also included in the AI assisted billing mailbox manager, identifies data that should be included or updated in the current attributes data 152. For example, if the email refers to a customer id and invoice number, then the current attributes data 152 may be updated to include a reference to the email. Moreover, metadata regarding the email such as the date and time of receipt may also be included in the current attributes data 152 by the data identifier 204 under the combination of the customer id and the billing number using text matching techniques for example. Subsequently, whenever the current attributes data 152 of the work item is accessed, information regarding the email may also be included within the current attributes data 152.

Various types of billing requests can be processed by the AI assisted billing mailbox manager 126. The various types of billing requests may pertain to updating the various attributes of a bill. If the type of billing request pertains to a change in options for one or more attributes, the options to be added or deleted can be automatically determined from the parsed text of the email obtained from the text parser 202. More particularly, the spreadsheet can be filtered based on types of options for each of the attributes, and the options can be added or deleted as per the information obtained by parsing the email including the billing request. If the type of billing request pertains to a change in a product associated with the bill, then the data identifier may obtain a product identity from the parsed text, obtain a product code from product information that may be stored on the central repository 150 as among the various options available to the product attribute of the bill and the product code is automatically updated within the current attributes data 152 of the bill. Similarly, if the type of billing request pertains to a change in a rate or amount to be billed, the rate to be updated is automatically determined from the parsed text, the data identifier can be configured to confirm that a current rate is different from a new rate to be updated and update the new rate within the current attributes data 152 of the bill.

Figure 3:
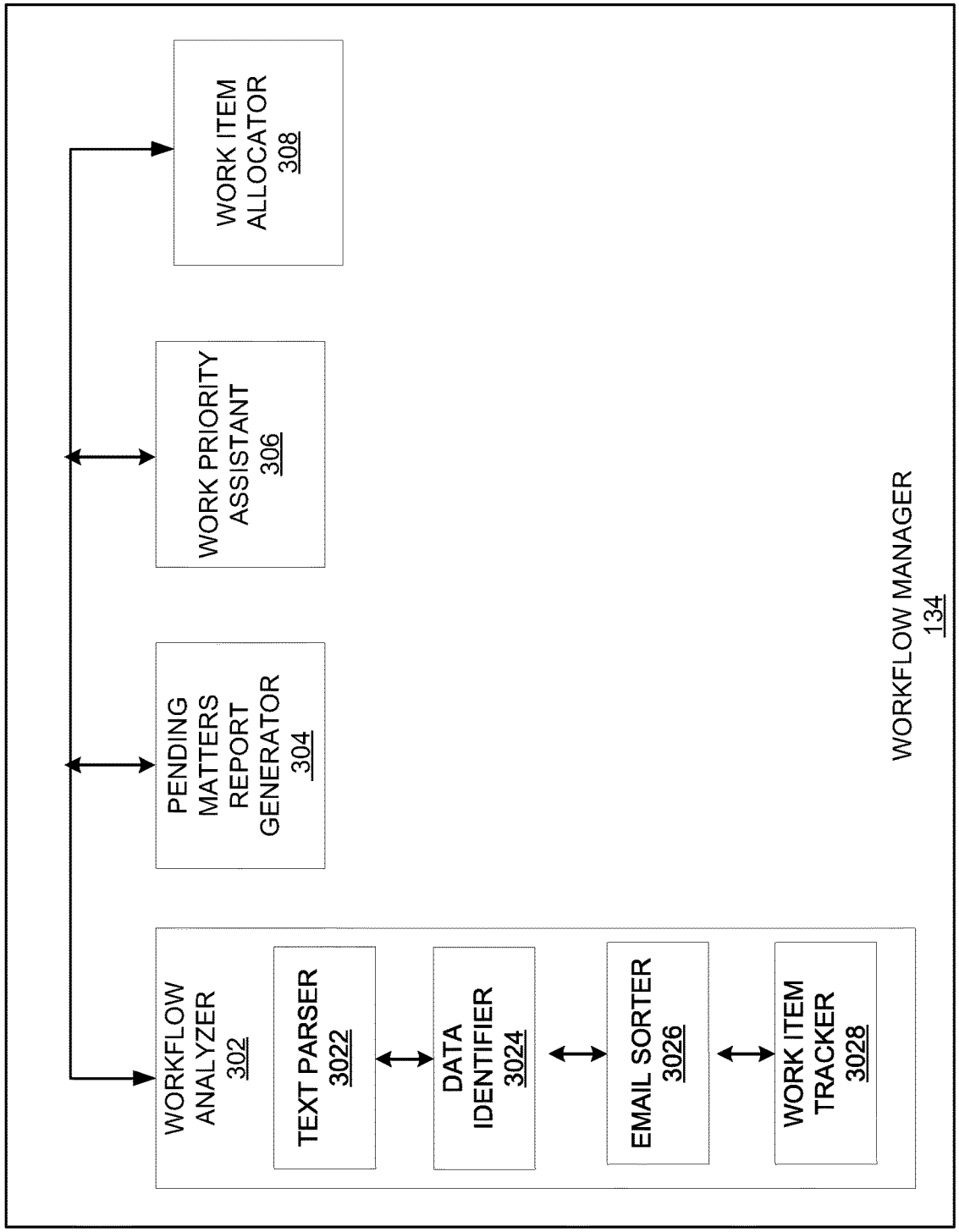
FIG. 3 is a block diagram of a workflow manager in accordance with an example disclosed herein.

FIG. 3 is a block diagram of the workflow manager 134 in accordance with an example disclosed herein. Each of the IBA 120, the iNCA 130, the DRA 140 include a respective workflow manager that accesses work items and generates daily priorities within a department and for individual employees of the department. While the workflow manager 134 for the iNCA 130 is discussed below, the details of the workflow manager 134 are equally applicable for the common functions executed by the workflow managers of the IBA 120 and the DRA 140. The details of such common functions will be discussed below where relevant. The workflow manager 134 includes a workflow analyzer 302, a pending matters report generator 304, a work priority assistant 306 and a work item allocator 308.

The workflow analyzer 302 included in the workflow manager 134 accesses and analyzes the emails from the collections mailbox 1340 to identify which of the emails are to be processed by the iNCA 130 and the emails that are to be processed by the DRA 140. In an example, the emails from external domains such as from the clients are received at the collections mailbox 1340 while internal emails from the domain hosting the robotic operations control system 100 are received at the billing mailbox 1222. The workflow analyzer 302 includes a text parser 3022, a data identifier 3024, an email sorter 3026 and a work item tracker 3028.

The text parser 3022 parses the text of each email accessed from the collections mailbox 1340. The data identifier 3024 filters the stop words, spaces, punctuation and the like from the parsed text and obtains relevant data from the email for updating the current attributes data 152 related to the work item such as a collections matter. Similarly, information regarding the receipt of the email and the related metadata such as the date, time of receipt, the sender, and the like can also be recorded as part of the current attributes data 152. The data and metadata can be updated to the current attributes data 152 using text matching or pattern identification techniques and the like. Similar techniques may be employed by the email sorter 3026 to sort the emails so that they are processed by the iNCA 130 or the DRA 140.

In an example, pattern matching techniques to identify a dispute case number or a bill number and the like may be used to allocate an email to the DRA 140. For example, the current attributes data 152 may already contain information to identify that a bill having a specific bill number is under dispute with a dispute case number allocated to it. Other techniques such as tracking a status of the bill via the current attributes data 152 may be employed by the email sorter 3026. Thus, even if the email does not include a dispute case number, it may be automatically forwarded to the DRA 140 for processing based on the billing number included in the email. Multiple analysis techniques may therefore be employed to identify and sort emails for being processed appropriately within the robotic operations control system 100. A work item tracker 3028 keeps track of work items that were pending from the previous days which are flagged to be completed on a given day. For example, a customer contact may not be available and may request a call back on the given day. In this case, the work item tracker 3028 follows up on such matters where the action is postponed to another day. The pending matters report generator 304 receives the emails to be processed by the iNCA 130 in addition to the matters flagged for follow up by the work item tracker 3028 and generates a report of the matters that are pending for the day.

The pending matters report is then accessed by the work priority assistant 306 that analyzes the pending matters and allocates priorities for a period, such as, a day. In an example, the work items that are flagged for follow up on a given day such as during resubmission, may have higher priority. Other information that is considered for priority can include the historic attributes data 154 such as customer profiles wherein customers with high volumes are given precedence over other customers with lower volumes. Furthermore, priorities may vary based on the function such as billing, collections or disputes. In an example, intelligent collection analytics can lead to optimized collection strategy by classifying existing customers into groups which are then assigned different priorities. For example, customers with overdue balances of over 80% can be classified as priority 1 while customers with bills unpaid for more than 60 days can be priority 2 and the like. The prioritized work items are then assigned or allocated to the various employees either automatically by the work item allocator 308 or by a supervisory employee. Automatic assignment of work items can be configured based on the current attribute data 152 of the work items and characteristics of the workers as detailed in the team matrix 158. Work items that are automatically assigned may be reviewed and altered by a supervisory employee. The work item assignments are received by the work item allocator 308 which stores the assignment information and sends emails to the respective employees regarding their work items for the day.

The workflow manager 122 of the IBA 120, the workflow manager of the DRA 140 and the workflow manager 162 of the cash processor 160 also operate similarly in identifying priorities, receiving assignments and generating pending work item reports.

Figure 4:
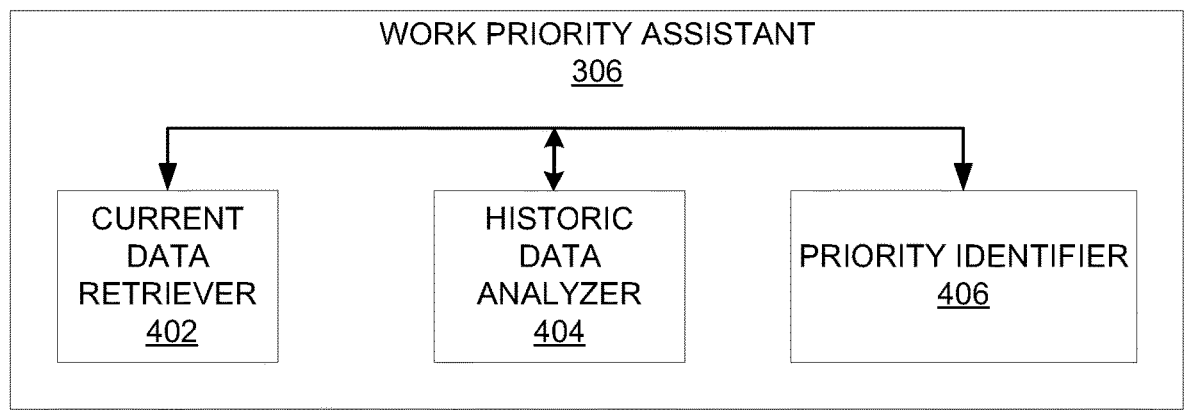
FIG. 4 shows a block diagram of a work priority assistant in accordance with an example.

FIG. 4 shows a block diagram of the work priority assistant 306 in accordance with an example. The work priority assistant 306 accesses current information of work items, analyzes the corresponding historic data and produces priority for each of the work items. In an example, the priority of a work item can be selected from predefined priority levels associated with different groups of work items. An example priority scheme may involve a plurality of priority levels, for example three priority levels. In the case of billing matters, priority level 1 may include high-value customers who have high accounts receivables values associated therewith. Priority level 2 may involve aged work items that are pending for more than a certain threshold time period. If a bill has been pending for more than a certain predefined time threshold, the work item associated with the bill can be automatically assigned priority 2 by default. Priority level 3 may include those work items which are customized for a geographic location or domain such as a specific country as the robotic operations control system 100 can be implemented across various countries. For example, work items related to a locally important customer may be assigned a priority level 3.

A current data retriever 402 retrieves the current attributes data 152 related to a work item currently being processed by the work priority assistant 306. The current data retriever 402 may obtain attribute data of the work item such as a customer associated with the work item, the period of pendency associated with the work item, the geographic location or domain of the work item and the like. The historic data analyzer 404 analyzes the historic data ranging from, for example, the preceding 16-18 months of the particular customer in order to identify the customer's payment trend, the volume of payments from the customer and the like. Based on the inputs from the current data retriever 402 and the historic data analyzer 404, the priority identifier 406 may classify the work item into one of the priority levels. If the work item can be classified into multiple priority levels, a higher priority level may be assigned to the work item. The priority levels defined above allow processing of high-value clients efficiently while simultaneously addressing aged items or regionally important clients. While one scheme of prioritization is discussed herein by the way of example, it can be appreciated that other priority schemes may also be implemented in accordance with examples described herein.

Figure 5:
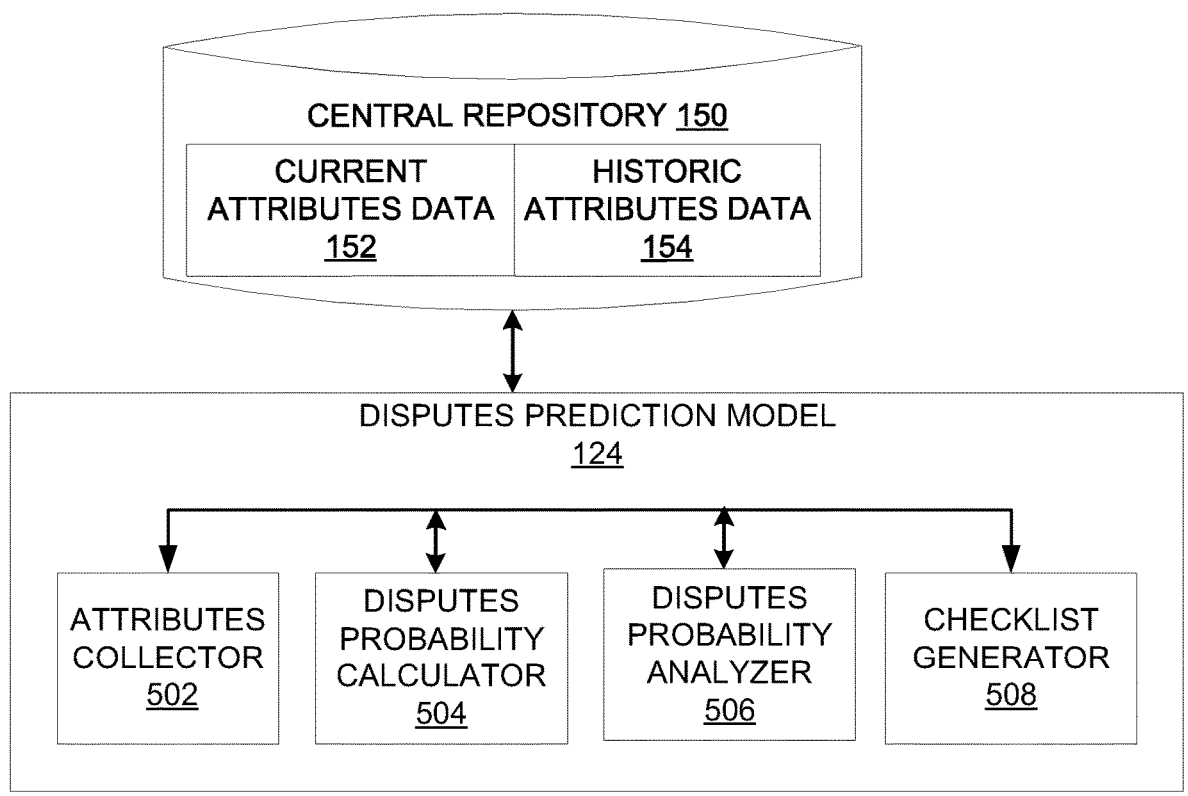
FIG. 5 shows a block diagram of a disputes prediction model in accordance with an example.

FIG. 5 shows a block diagram of the disputes prediction model 124 in accordance with an example. The disputes prediction model 124 receives input data from the central repository 150 employs disputes prediction analytics to estimate the likelihood of dispute in each newly created billing matter. When a billing matter is created or a bill is generated, the attributes collector 502 gathers the current attributes data 152 of the bill. In addition, the historic attributes data 154 of the bill's attributes may also be obtained. By the way of illustration and not limitation, if the bill pertains to a courier service, the attributes of the bill such as the customer shipping the package, the shipping distance, the starting and the delivery locations, weight of the package, date the package was mailed, shipping speed of the package, the items shipped within the package, taxes and duties on the package and the like are collected by the attributes collector 502 from the current attributes data 152. For each attribute that is obtained by the attributes collector 502, the disputes probability calculator 504 estimates the probability of occurrence of the dispute using the historic attributes data 154. For a given attribute, the historic attributes data 154 of one or more of dispute history of the customer associated with the bill and the dispute history of the attributes across all the customers can be considered in the dispute probability calculations. The disputes probability analyzer 506 compares the dispute probability of each attribute with predetermined threshold values to determine if the attribute has a high likelihood of being disputed. If the dispute probability of the attribute is higher than the threshold value, then the attribute may be marked for including in a checklist by the disputes probability analyzer 506. The checklist generator 508 receives information regarding each attribute whose dispute probability is higher than the respective threshold. The checklist generator 508 automatically generates the checklist by including respective checkpoints which may include one or more questions in the checklist. The questions can be directed towards confirming the values of the attributes.

Figure 6:
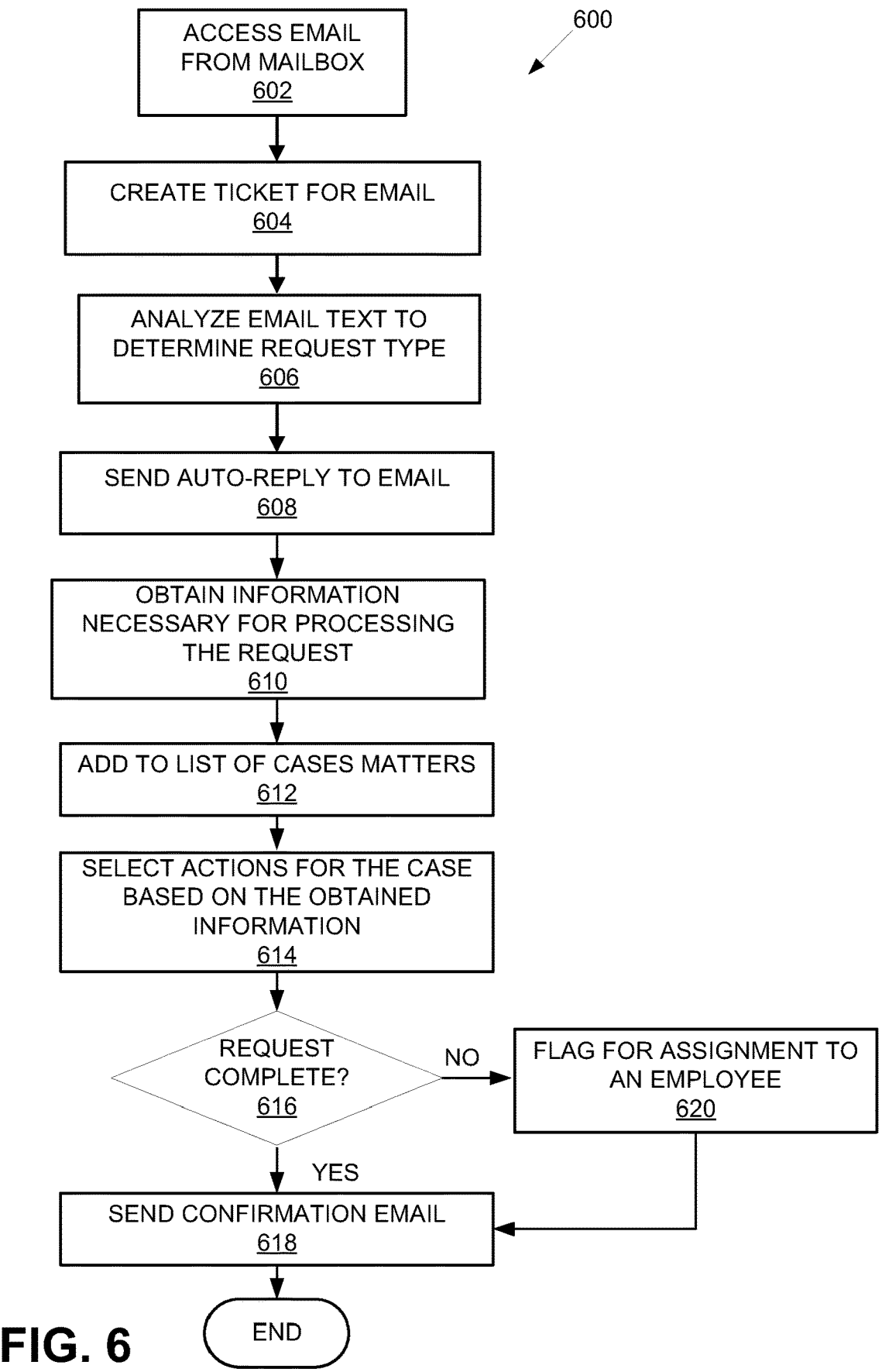
FIG. 6 is a flowchart that details a method of processing an email by an AI assisted billing mailbox manager in accordance with an example.

FIG. 6 is a flowchart 600 that details a method of processing an email by the AI assisted billing mailbox manager 126 in accordance with an example. The method begins at 602 wherein an email is accessed from a mailbox. The email may have been sent by a helpdesk agent regarding a customer call or other issues. At 604 a ticket is created for the email so that the actions taken in response to the email can be tracked from the receipt of the email to the resolution of the issues raised in the email. In an example, the ticket can be uploaded so that the status of the ticket can be obtained, for example, via the real-time dashboard 132. At 606, the email text is analyzed to determine the identification indicia of the billing matter and a request type. In an example, the robotic operations control system 100 is programmed to handle various types of requests which may require specific keywords, codes and the like. The sender of the email may place the codes, keywords or other issue-identifying indicia within the email. The various billing request types may include requests for change in options such as for options to be added or deleted, a request for a product change wherein a product code in the bill is to be updated or a change in the discount percentages which results in the change if the billed amount. At 608, an auto-reply is transmitted to the sender of the email. In an example, the auto-reply may include information such as the issue-identifying indicia from the email so as to initiate the processes are to be executed in response to the email.

The information necessary for processing the request in the email is obtained at 610. For example, if the email is regarding an existing billing matter that has already been through some processes, the case history, including documents such as invoices, delivery receipts, communications that were exchanged such as email chains, chat logs, calls to customer service agents, automated messages and the like can be obtained at 610. The email is added to the list of billing matters within a spreadsheet for example, for processing by the robotic operations control system 100 at 612. The actions that can be executed for completing the request or resolving the issues raised in the email are selected at 614 based on the information in the email.

In some examples, the actions may include robotic processes that do not require human intervention whereas in some examples, manual input may be necessary to complete the actions. For example, if the email is a request for bills or copies thereof, the actions selected at 614 can include automatically transmitting the bills to the corresponding contacts included in the current attributes data 152 of the billing matter via a robotic process without the need for manual input. At 616, it is determined if the request is completely addressed. If yes, the method proceeds to send confirmation email at 618 regarding completion of the request to the supervisor and/or the billing mailbox 1222 and the method terminates on the end block. If it is determined at 616 that the request is not complete or the issues in the email could not be completely addressed via automatic actions selected at 614, the email is flagged for manual input or for assignment to an employee at 620 and the method terminates on the end block. During manual processing, an employee who is assigned the work item may request access to the information corresponding to the work item and the email, along with other documents and the current attributes data 152 of the work item is provided to the employee.

Figure 7:
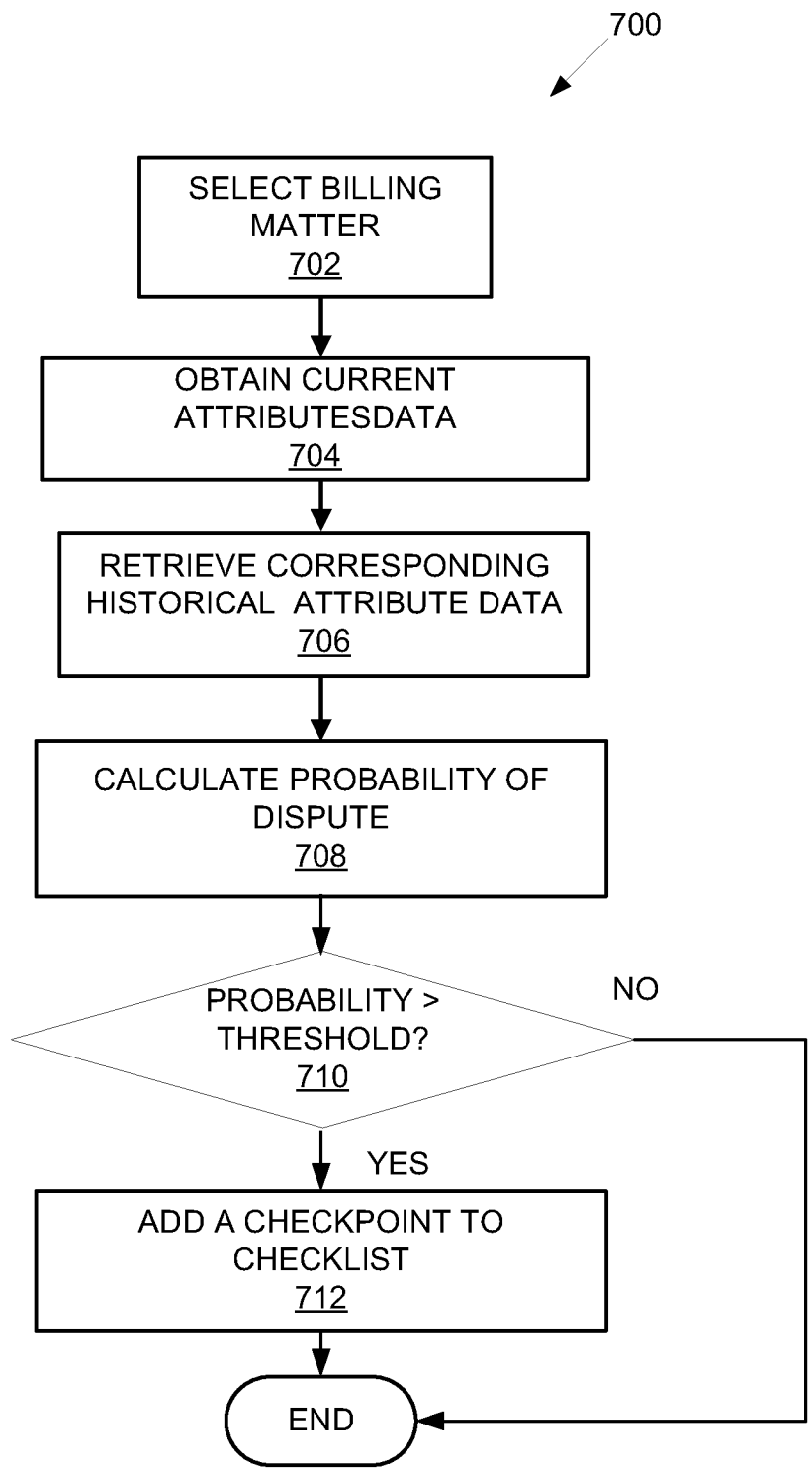
FIG. 7 is a flowchart wherein a disputes prediction model is employed to generate a checklist that enables reducing disputes in accordance with an example.

FIG. 7 is a flowchart 700 wherein a disputes prediction model 124 is employed to generate a checklist that enables reducing disputes in accordance with an example. The method begins at 702 wherein a billing matter is selected for processing and the current attributes data 152 for the billing matter is obtained at 704. The corresponding historic attributes data 154 is retrieved at 706. The values within the current attributes data 152 are analyzed in view of the historic attributes data 154. For example, the current attributes of the billing matter may include a customer name, a billed amount, a matter for which the amount was billed, a billing period and the like. The historic attributes data 154 can include prior values of the various attributes of the bill for a given customer such as prior billed amounts, prior billing periods, matters which were previously billed for and the like.

For each of the current attributes, a probability of occurrence of dispute within each of the current attributes based on the historic attributes data 154 is obtained at 708. Thus, for a customer name or a customer id, the probability of occurrence of dispute in the current billing matter is calculated based on prior transaction history of the customer for similar billing matters. Likewise, probabilities of occurrences of disputes for a billed amount, a billing period and the like can be calculated based on the prior transaction history stored as the historic attributes data 154. The probabilities of occurrences of disputes for the current attributes of the billing matter are compared with respective predetermined thresholds at 710. The predetermined thresholds may be calculated as the number of billing matters disputed within the total billing volume for the attribute in accordance with one example. Other measures may also be employed for determining the thresholds in accordance with examples described herein. If the probability of occurrence of the dispute is greater than the respective threshold for a given attribute, then a respective check point for the attribute such as a question is added to the checklist generated at 712, else the method terminates on the end block. A checklist customized to a particular bill is thus generated automatically based on the calculated probabilities of occurrences of disputes in each of the attributes of a billing matter which enables proactively working to avoid disputes and the resultant wastage of time and resources in dispute resolutions.

Figure 8A:
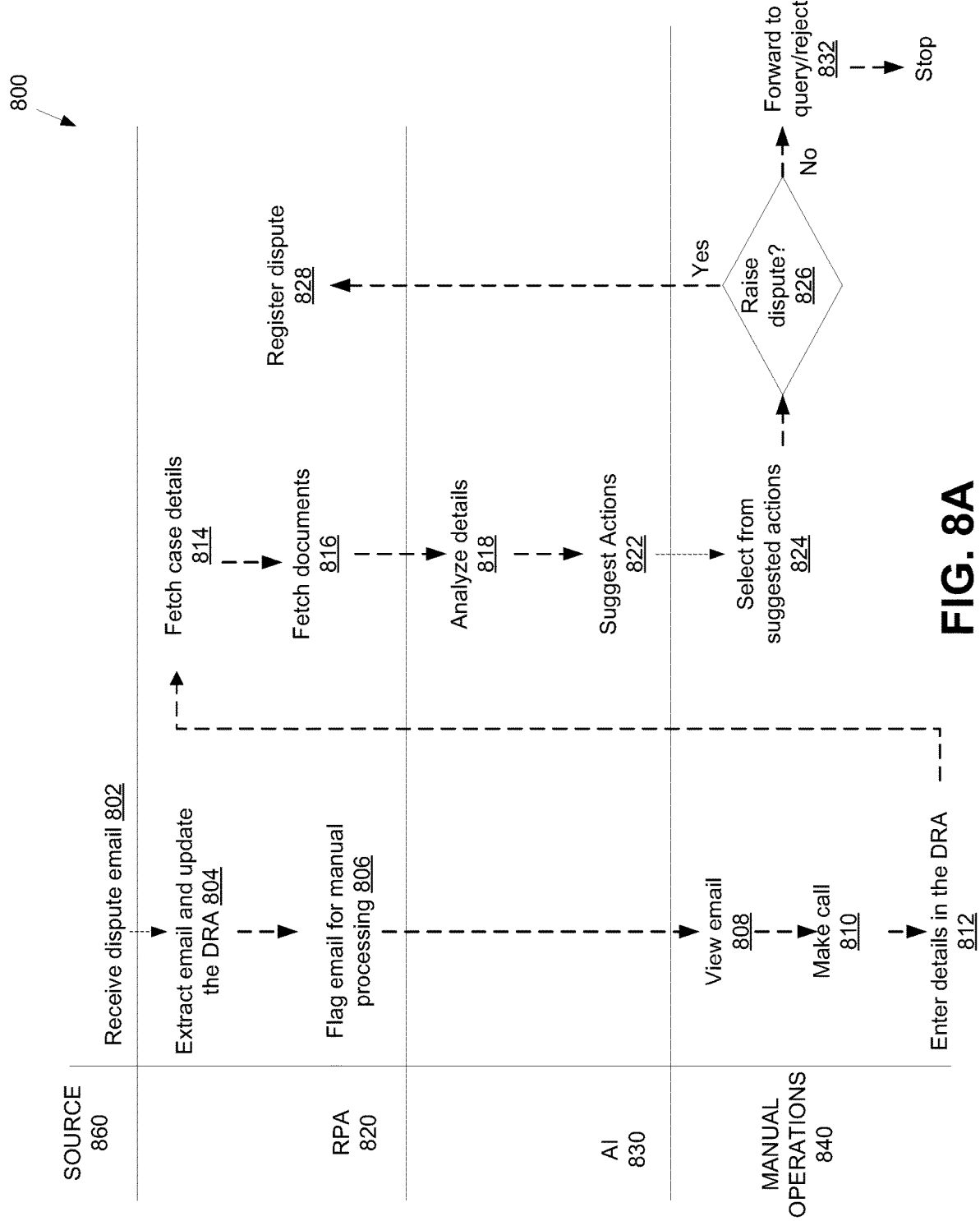
FIGS. 8A and 8B are flow diagrams that illustrate how a blended workforce manages an example task
Figure 8B:
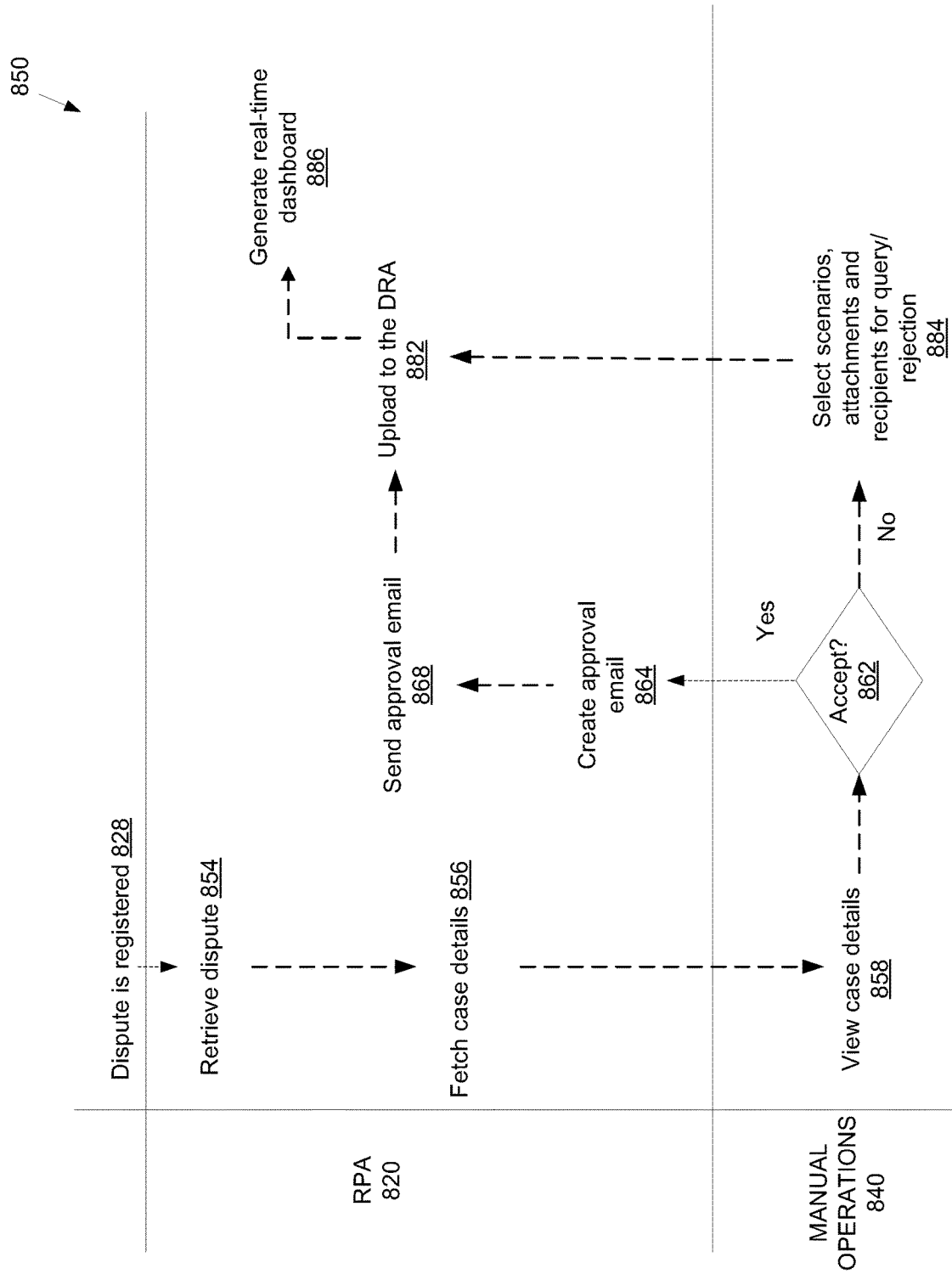

FIGS. 8A and 8B are flow diagrams 800 and 850 respectively that illustrate how a blended workforce manages an example task such as a dispute resolution via seamlessly switching between the manual operations 840 conducted by human employees, RPA 820 and AI 830 within the robotic operations control system 100. The RPA 820 and the AI 830 can be incorporated into one or more of the parts of the DRA 140 as described supra. An RPA process may be carried out automatically with certain pre-programmed instructions via definite process steps. An AI process can be carried out automatically via pre-programmed instructions that include processing/analysis of data which may requires the AI elements to make decisions or provide suggestions. Thus, the process of analyzing the dispute details and suggesting actions 822 are AI processes executed by the AI elements.

When a dispute email is received 802 at the source 860 such as the billing mailbox 1222, the email is automatically extracted and updated 804 to the DRA 140 for resolution and flagged 806 for further manual input from an employee. The email is then processed under manual operations 840 wherein a supervisor may allocate the email to an employee who views the email 808, makes a call 810 to the corresponding customer and enters the details 812 in the DRA 140. For example, the employee may call the contact or the concerned party at the customer who launched the dispute to verify the attributes of the billing and collection matters if any. In an example, the employee may confirm that the dispute exists and the reason for the dispute with the customer and enter appropriate reasons codes that may be configured within the DRA 140. The details which are manually verified may be entered 812 within the DRA 140.

The details that are thus collected along with other details that may exist within one or more of the current attributes data 152 and the historic attributes data 154 are automatically fetched 814 along with the corresponding documents 816. For example, the bills, email exchanges, recorded voice conversations, chat and instant messaging logs and the like associated with the billings and/or collections matter are fetched at 814 and 816. The details are analyzed at 818 and the suggested actions 822 are retrieved based on the analysis. For example, the analysis may be based on the reason codes, and the facts associated with the reason codes can be verified from the documents and if the facts bear out, the actions to resolve or remedy an error that caused the dispute may be automatically suggested by the AI 830 of the DRA 140. The procedure again awaits manual selection 824 from the automatically suggested actions. Based on the verification of the facts and the suggested actions, the employee further decides 826 if a dispute should be raised. If the employee decides that a dispute is to be raised, the dispute is registered 828 for further processing else the email may be forwarded for further query or the dispute is rejected 832 by the employee if the facts do not conform or are inconsistent.

FIG. 8B shows the backline processing that occurs seamlessly between the RPA 820 and the manual operations 840 when a dispute is registered in accordance with the examples described herein. When a dispute is registered 828, the RPA 820 automatically retrieves the dispute 854 and fetches the case details 856, for example, when an access request is received from an employee who is assigned the work item associated with the dispute. The case details at 856 would include the information entered into the DRA 140 during the call made at 810 which may include data such as the reason codes. During the manual operations 840, the case details 858 are viewed by an employee who is assigned to the case and the employee determines if the dispute is valid and should be accepted 862. If the dispute is accepted, an approval email is automatically created 864 by the RPA 820 and sent 868 to the concerned parties. The information regarding the approval is also automatically uploaded to the DRA 140. In case the employee decides that the dispute is not valid or has further questions regarding the dispute, the employee selects appropriate scenarios which fit the dispute conditions and circumstances in addition to the attachments and the recipients to send 884 one of a query or rejection. Selection of the appropriate scenario can provide a pre-made template email that already includes language that fits the dispute conditions. The employee may quickly customize the email with the customer name, dispute registration number and other attribute data prior to sending it out to the recipients. The information regarding the rejection and query is also uploaded 882 to the DRA 140. A real-time dashboard is generated 886 which provides the timelines for dispute resolution in addition to the functions carried out by the RPA 820, AI 830 and the manual operations 840. The real-time dashboard enables a supervisor to judge the efficiency of various elements of robotic operations control system 100 and identify opportunities for improvement.

Figure 9:
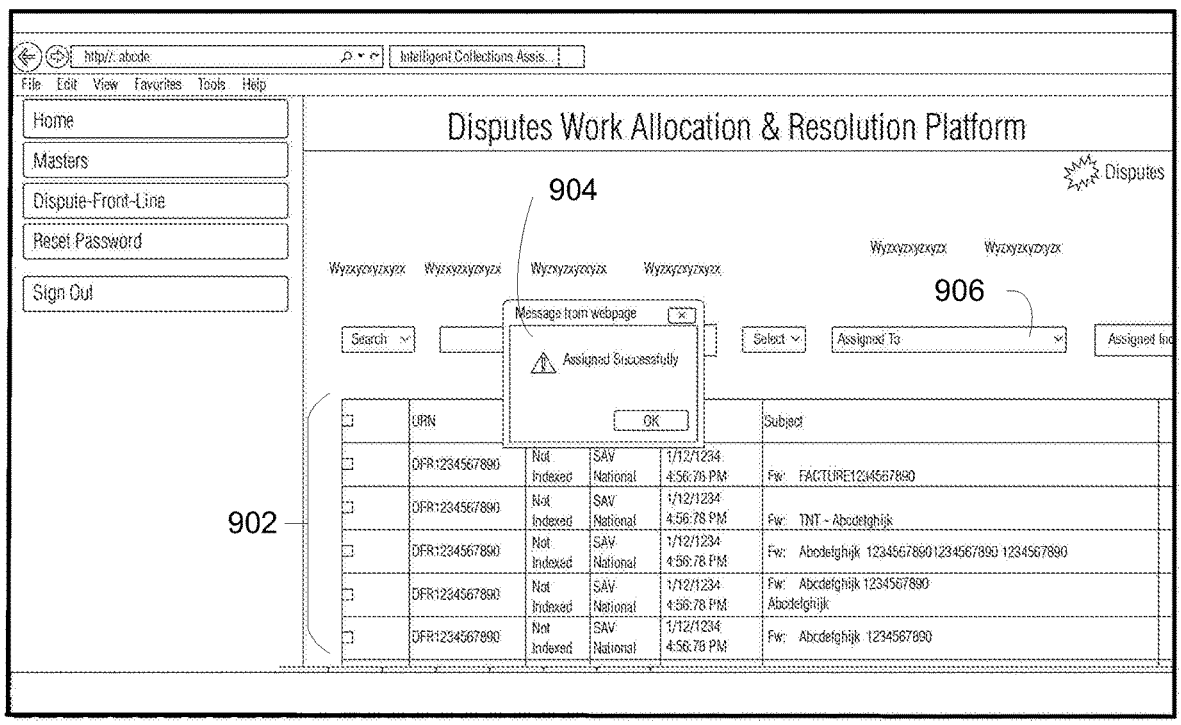
FIG. 9 shows a user interface which enables assignment of work items to employees in a DRA in accordance with examples disclosed herein.

FIG. 9 shows a user interface 900 which enables assignment of work items to employees in the DRA 140 in accordance with examples disclosed herein. A list of work items 902 is displayed to a supervisor. In an example, the list of work items 902 may be ordered based on priorities generated automatically as described herein. The supervisor may select each work item and select an employee who will be assigned the work item from a dropdown list box 906. Successful assignment of the work item is conveyed to the supervisor via output such as a pop up box 904. It can be appreciated that similar assignment schemes are also implemented in the IBA 120 and the iNCA 130 in accordance with examples described herein.

Figure 10:
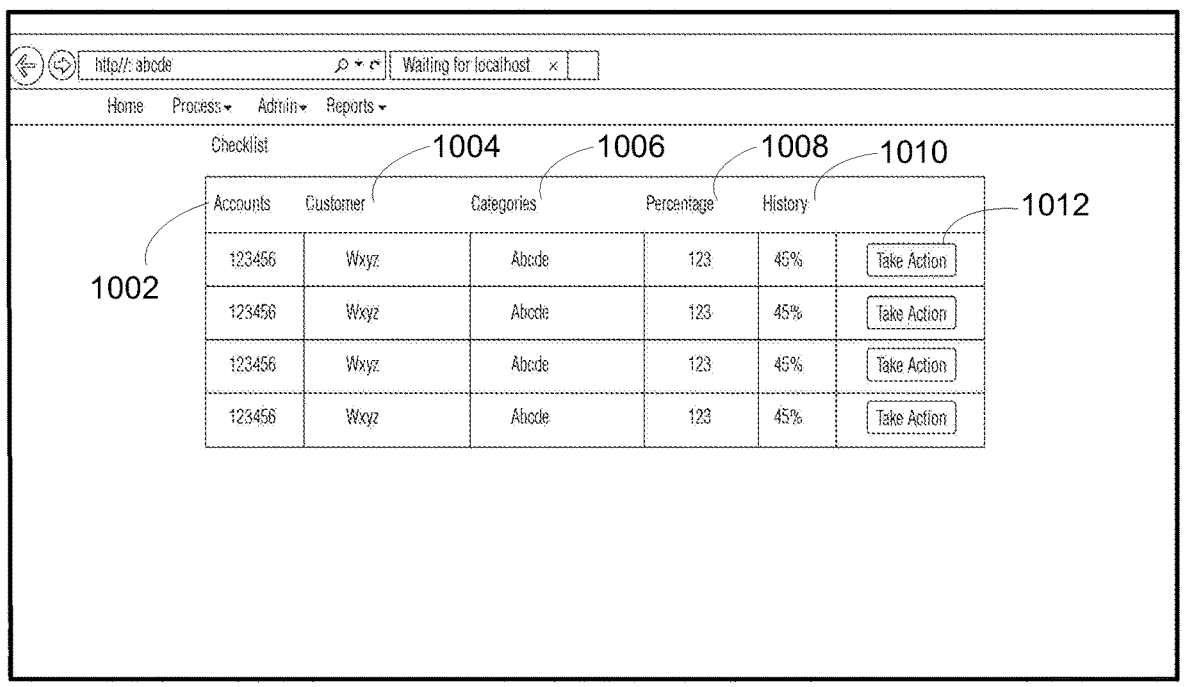
FIG. 10 shows the various client ids and billing matter categories which were significantly disputed.

FIG. 10 shows another user interface 1000 that displays the various client ids and billing matter categories which were significantly disputed as determined from the historic attributes data 154 in accordance with an example. The customers are identified by account number 1002 and name 1004 while the categories 1006 may be identified by codes as shown. The percentage of likelihood 1008 that a dispute arises for the client for the specific category is shown along with the historical percentages 1010. In an example, the percentage may be obtained based on the calculations by the disputes prediction model 124. When an employee selects to take action 1012, a checklist can be generated as described herein.

Figure 11:
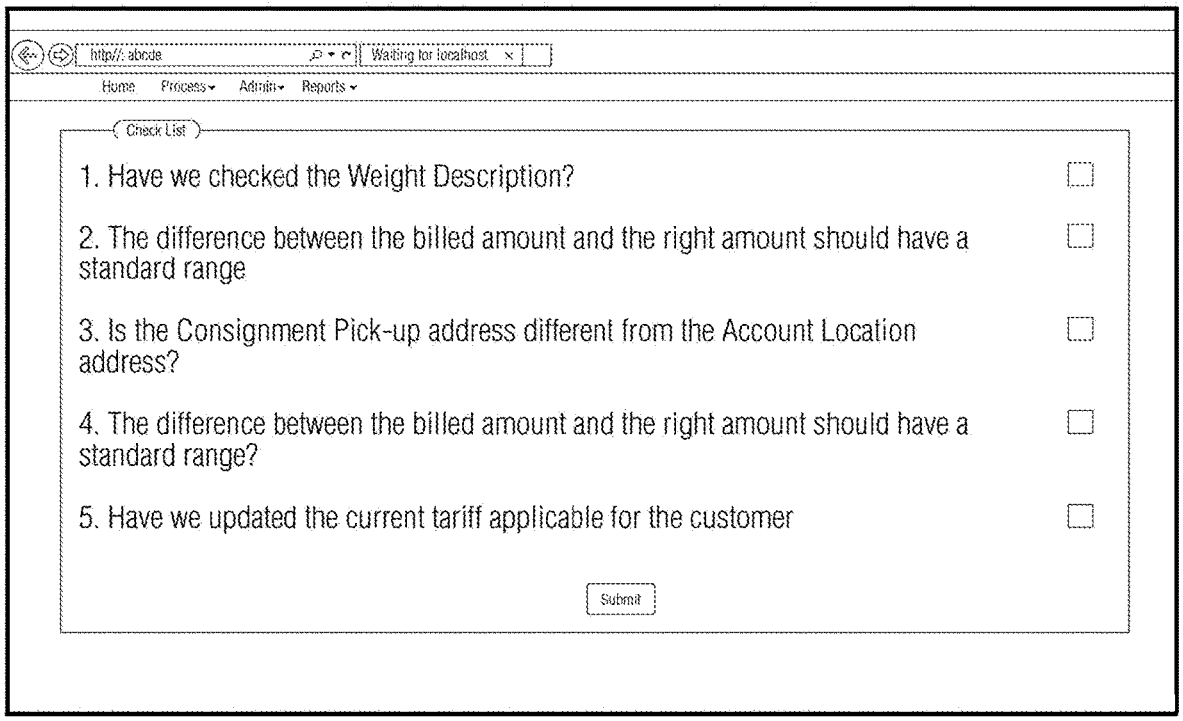
FIG. 11 shows a checklist that is generated in accordance with examples described herein.

FIG. 11 shows a checklist 1100 that is generated in accordance with examples described herein. The checklist contains a number of questions that are automatically generated based on the probability of dispute for each attribute of the billing matter. An employee is supposed to verify the checklist0 prior to submitting a bill in order to reduce the probability of dispute. When the employee submits a completed checklist, the data may be recorded within the central repository 150 for later retrieval.

Figure 12:
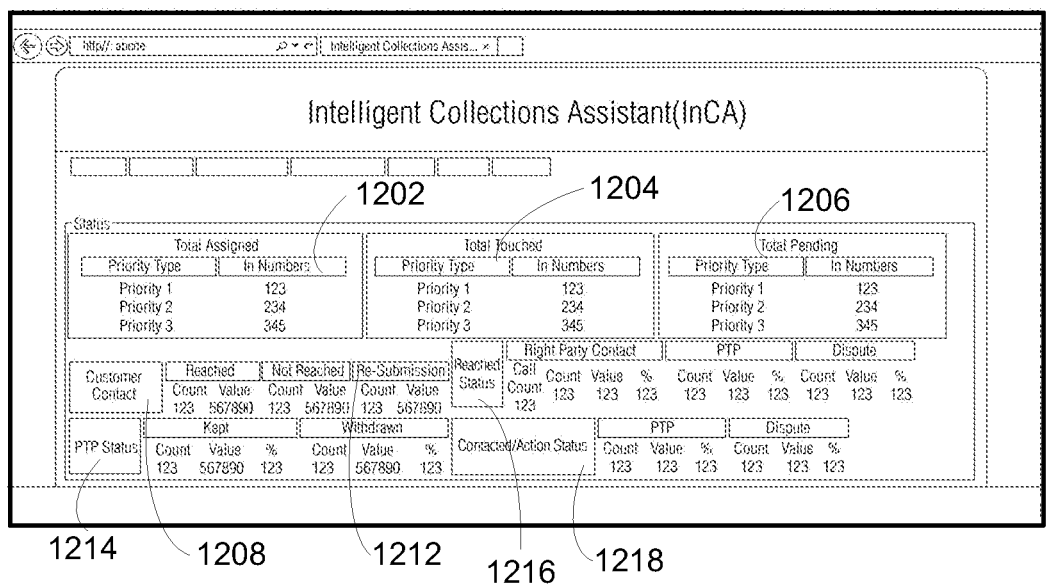
FIG. 12 shows a user interface or a real-time dashboard of an iNCA in accordance with an example.

FIG. 12 shows a user interface (UI) or a real-time dashboard 146 of the iNCA 130 in accordance with an example. The real-time dashboard 146 shows a summary of the workflow within the iNCA 130 at any given time. The number of work items for each of the three priorities that are assigned 1202, that were touched 1204 and the current pending work items 1206 are shown. Other information such as the number of cases where there was customer contact 1208 for collections, the customers who were reached, who could not be reached and those which are re-submitted are displayed. When a customer was not reached or requested call back at another specified time, the work item may be re-submitted 1212 for action at that specified time. The priority of the work item may be adjusted accordingly by the AI prioritizing assistant 136. Also, the status of the various promise to pay (PTP) 1214 wherein customers promise to pay a certain amount at a later date and whether such PTPs were kept or withdrawn are also shown. Similarly the 'reached' status 1216 which indicates if the right person was reached and the contacted/action status 1218 are also tracked.

Figure 13:
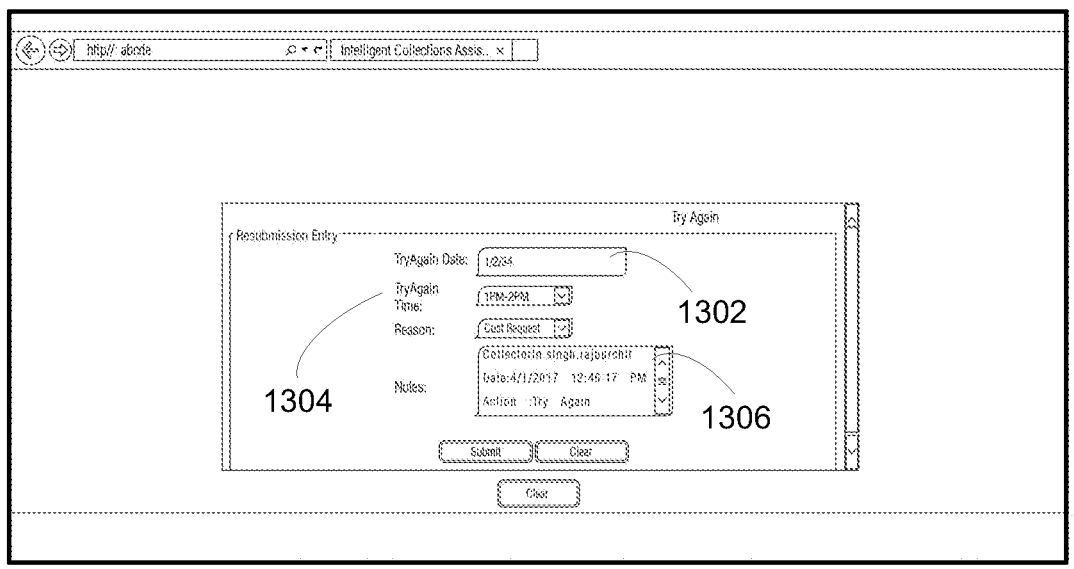
FIG. 13 shows a resubmission screen in accordance with an example.

FIG. 13 shows a resubmission screen 1300 in accordance with an example. The resubmission screen 1300 includes a Try Again Date 1302, a Try Again Time 1304, the Reason 1306 for having to try again and the notes made by the employee. In an example, the notes may be automatically supplied as a template within the iNCA 130. The resubmission will indicate to an employee that the work item can be prioritized lower until the Try Again Date occurs when the work item needs to be moved up the priority list.

Figure 14:
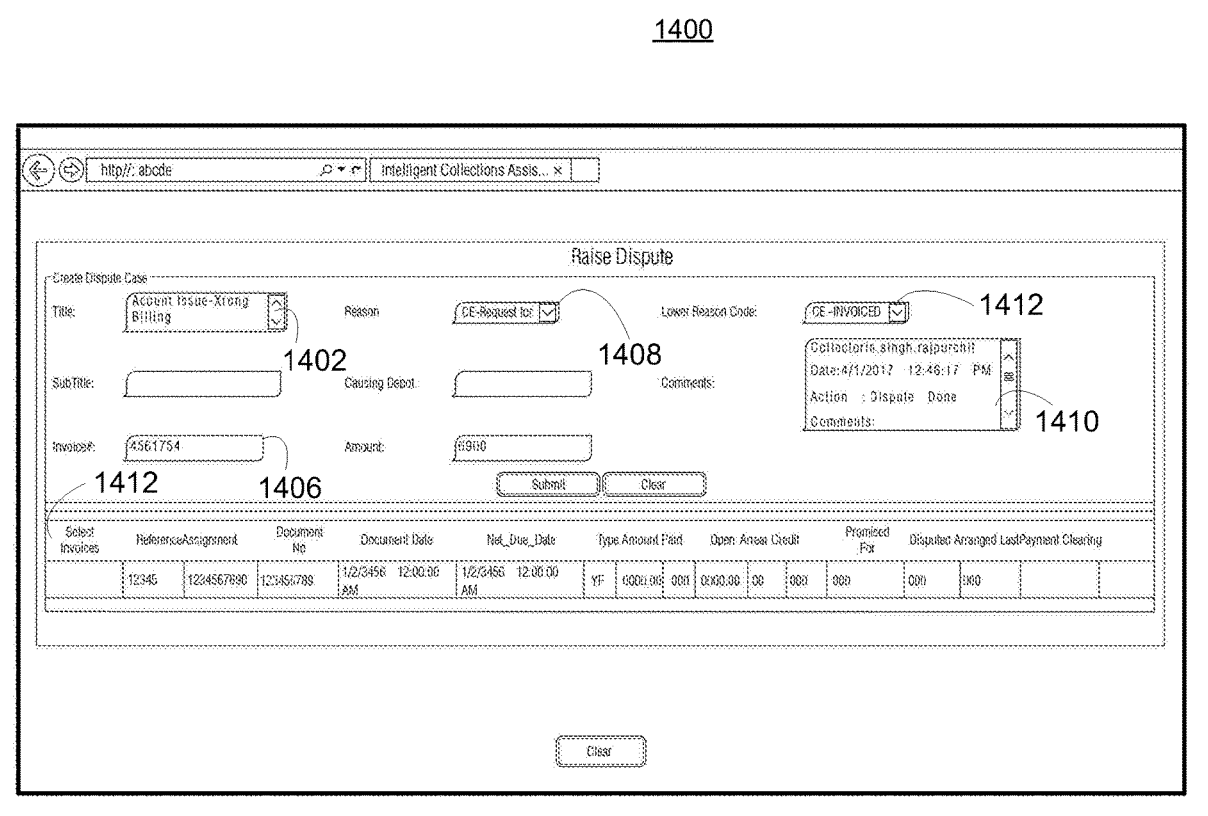

FIG. 14 shows a screen 1400 to raise a dispute in accordance with an example. The current attributes data 152 of the work item such as the title 1402, the invoice number 1406, reason for the dispute 1408, the reason code 1412 and the comments 1410 associated with the dispute which may have been entered manually or automatically.

Figure 15:
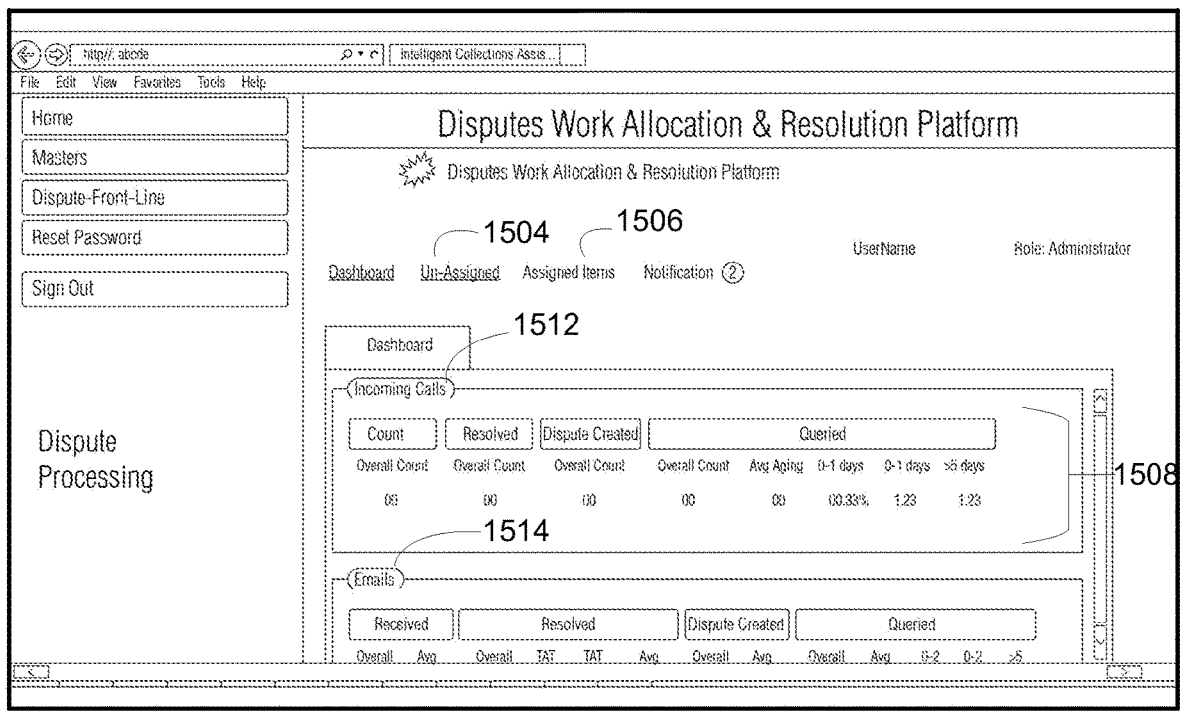
FIG. 15 shows a dashboard of the DRA that in accordance with an example.

FIG. 15 shows a dashboard of the DRA 140 that in accordance with an example. The screen also includes links to the dashboard 140 itself, a link to the unassigned work items 1504, a link to the assigned work items 1506 and related notifications. The dashboard 1500 includes tabs 1512, 1514 and the like that show statistics for disputes raised via various modes of communication. For example, the tab 1512 shows the statistics 1508 raised for incoming calls. The tab 1514 shows the statistics for disputes raised via emails. The statistics 1508 may include a count of the disputes which were registered, the disputes which were created, the disputes which were resolved and disputes which were queried over different time periods and the like.

Figure 16:
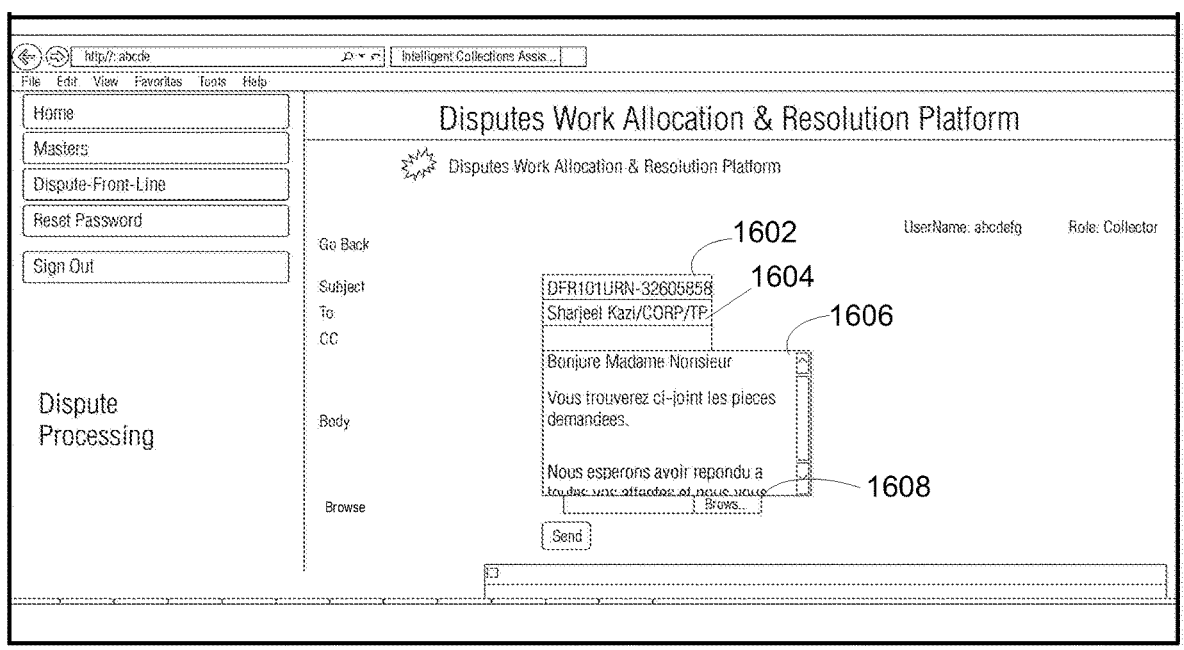
FIG. 16 shows an email that was automatically generated for a communication regarding a dispute in accordance with an example.

FIG. 16 shows an email 1600 that was automatically generated for a communication regarding a dispute in accordance with an example. The subject of the email 1602, the recipients in the "to" address line 1604 and the body of the email 1606 may be been obtained from a pre-configured template which is customized to include data from the current attributes data 152 of the work item. In addition, certain attachments may be already included with the email. However, a browse button 1608 enables an employee to add files as needed. Also, each of the email fields, 1602, 1604 and 1606 may be further customized by the employee.

Figure 17:
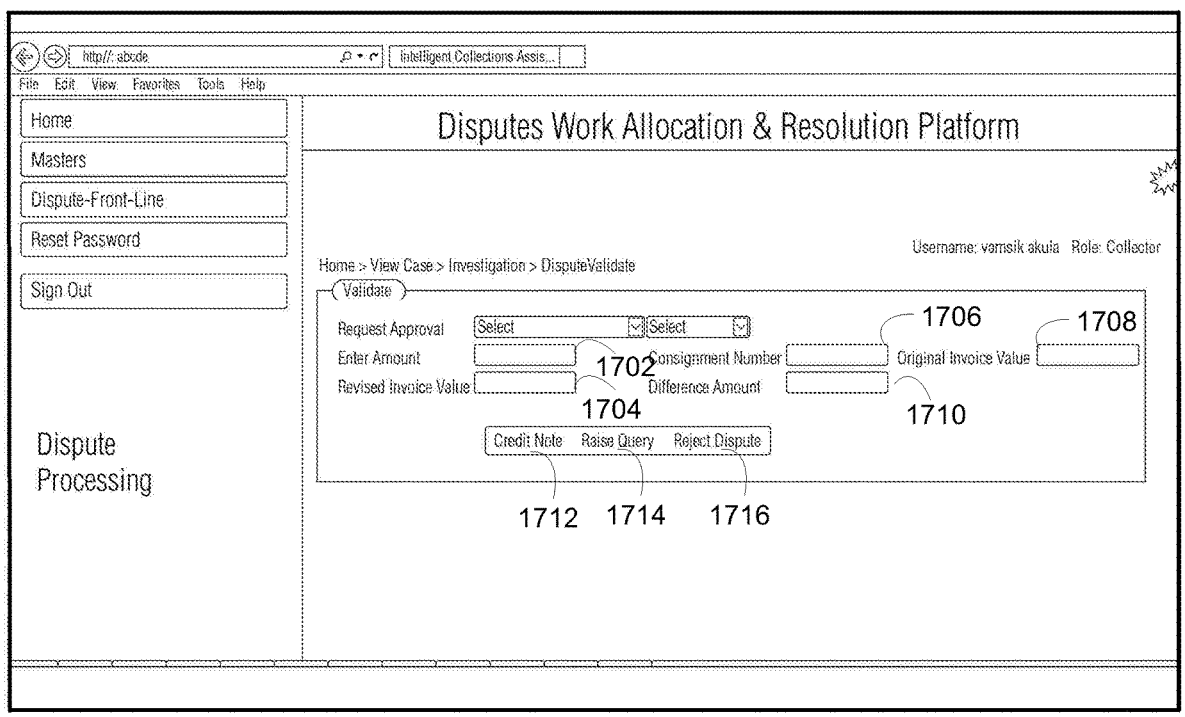
FIG. 17 shows a dispute validation screen in accordance with an example.

FIG. 17 shows a dispute validation screen 1700 in accordance with an example. When it is determined that a dispute is valid, not valid or further information is required after an investigation, the dispute validation screen 1700 allows an employee to resolve the dispute via arranging for a credit, rejecting the dispute or raising a query respectively. The dispute validation screen 1700 shows the fields for a dispute which may include an amount 1702, an invoice value 1704, a consignment number 1706, an original invoice value 1708 and the difference amount 1710. In addition, the buttons for issuing a credit note 1712, raising a query 1714 or rejecting the dispute 1716 are also included. If one of the credit note 1712, raise query 1714 or reject dispute 1716 buttons are selected, the associated processes are automatically set in motion via the RPA 820.

Figure 18:
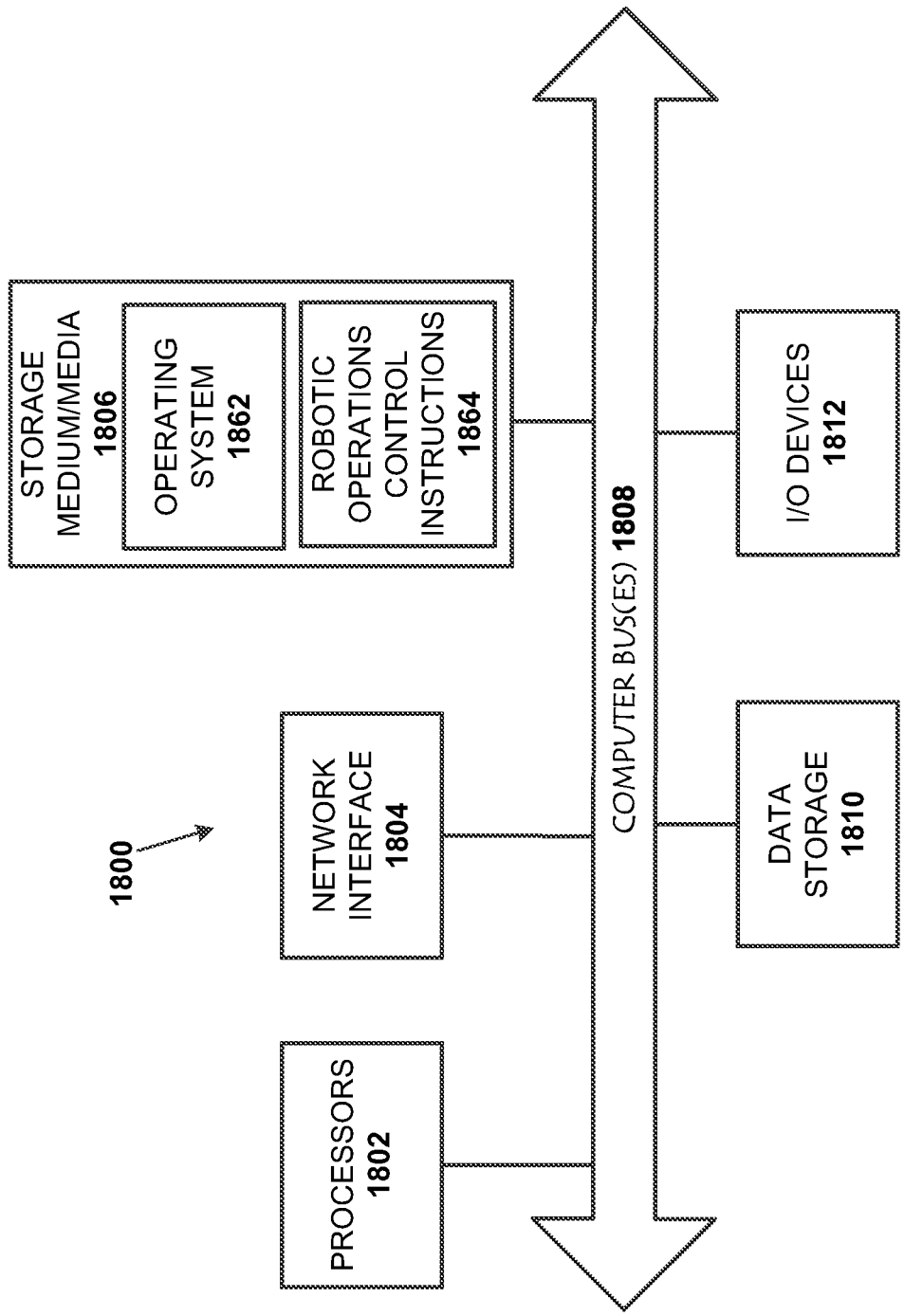
FIG. 18 is a block diagram that illustrates an example of a computer system for implementing the robotic operations control system.

FIG. 18 illustrates a computer system 1800 that may be used to implement the robotic operations control system 100. More particularly, computing machines such as desktops, laptops, smartphones, tablets, wearables which may be used to generate or access the reports may have the structure of the computer system 1800. The computer system 1800 may include additional components not shown and that some of the components described may be removed and/or modified.

The computer system 1800 includes processor(s) 1802, such as a central processing unit, ASIC or other type of processing circuit, input/output devices 1812, such as a display, mouse keyboard, etc., a network interface 1804, such as a Local Area Network (LAN), a wireless 802.11x LAN, a 3G or 4G mobile WAN or a WiMax WAN, and a computer-readable medium 1806. Each of these components may be operatively coupled to a bus 1808. The computer-readable medium 1806 may be any suitable medium which participates in providing instructions to the processor(s) 1802 for execution. For example, the computer-readable medium 1806 may be non-transitory or non-volatile medium, such as a magnetic disk or solid-state non-volatile memory or volatile medium such as RAM. The instructions or modules stored on the computer-readable medium 1806 may include machine-readable instructions 1864 executed by the processor(s) 1802 to perform the methods and functions of the robotic operations control system 100.

The robotic operations control system 100 may be implemented as software stored on a non-transitory computer-readable medium and executed by one or more processors. For example, the computer-readable medium 1806 may store an operating system 1862, such as MAC OS, MS WINDOWS, UNIX, or LINUX, and code 1864 for the robotic operations control system 100. The operating system 1862 may be multi-user, multiprocessing, multitasking, multithreading, real-time and the like. For example, during runtime, the operating system 1862 is running and the code for the robotic operations control system 100 is executed by the processor(s) 1802.

The computer system 1800 may include a data storage 1810, which may include non-volatile data storage. The data storage 1810 stores any data used by the robotic operations control system 100. The data storage 1810 may be used to store real-time data from the current attributes data 152, historic attributes data 154, performance statistics of the robotic operations control system 100 and the like.

The network interface 1804 connects the computer system 1800 to internal systems for example, via a LAN. Also, the network interface 1804 may connect the computer system 1800 to the Internet. For example, the computer system 1800 may connect to web browsers and other external applications and systems via the network interface 1804.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A robotic operations control system, comprising:
one or more processors; and
a non-transitory data storage medium comprising instructions that cause the processors to:
import by the robotic operations control system having a plurality of robot assistants, emails from an email server into respective mailboxes associated with one or more of the plurality of robot assistants, wherein the emails include one or more work items that are to be assigned to a blended workforce, the blended workforce comprising one or more human employees and the plurality of robot assistants that include at least one of the processors and at least an intelligent billing assistant (iBA), an intelligent collection assistant (iNCA) and a disputes resolution assistant (DRA) wherein the iBA includes a dispute prediction model that estimates a likelihood of dispute in each newly created billing matter;
automatically forward the emails including the work items to one or more of the employees, wherein at least one of the work items includes at least two work items that further include at least a matter to be billed forwarded to the iBA and a collection matter forwarded to the iNCA,
wherein for the at least one work item associated with the matter to be billed, causing the iBA to:
retrieve the emails associated with the work item;
parse the emails associated with the work item;
extract, by the iBA using natural language processing (NLP) techniques that include the parsing of the emails, current attributes including identifying indicia of the matter to be billed and a type of billing request from text of emails associated with the at least one work item associated with the matter to be billed;

analyze current attributes data and historic attributes data of the work item using the dispute prediction model;
determine a likelihood of a dispute based on the analysis;
automatically generate a checklist to an employee of the one or more human employees assigned to the at least one work item associated with the matter to be billed, the checklist comprising one or more of the current attributes of the matter to be confirmed by the employee in response to the likelihood of dispute being higher than a threshold value for the one or more current attributes;
wherein if the at least one work item associated with the matter to be billed pertains to one of a change in options, a product change and a rate change, causing the iBA to:
transmit the emails along with the identifying indicia for the at least one work item associated with the matter to be billed to the employee in response to an access request from the employee assigned to the at least one work item associated with the matter to be billed;
wherein for the at least one work item associated with the collection matter causing the iNCA to:
set a priority for the at least one work item associated with the collection matter relative to other work items associated with collection matters, the priority being based at least on current attributes data and the historic attributes data of the at least one work item associated with the collection matter;
retrieve pre-call information including one or more emails relevant to the at least one work item associated with the collection matter and the emails include the current attributes data for the work item associated with the collection matter that has been prioritized;
receive and store post-call information to the current attributes data for the at least one work item associated with the collection matter;
parse text of the at least one work item associated with the collection matter;
determine based on the parsing, if the text includes one or more of particular data fields and textual patterns indicative of a dispute;
wherein if the at least one work item associated with the collection matter is associated with the dispute:
retrieve the current attributes data including the post-call information and historic attributes data for the at least one work item associated with the collection matter;
receive an input from the employee on whether or not a dispute is to be registered;
if a dispute is to be registered:
update the current attributes data of the at least one work item associated with the collection matter to register the dispute with the DRA;
enable processing of the dispute by the DRA;
if the dispute is not registered:
receive the employee's selection of a scenario, recipients and attachments for one of a query or rejection; and
transmit an email to a contact party associated with the dispute regarding the querying or the rejection of the dispute.

2. The robotic operations control system of claim 1, wherein the instructions to determine the likelihood of a dispute further comprise instructions that cause the processors to:
receive access requests for the work items from respective employees to whom the work items are assigned.

3. The robotic operations control system of claim 1, wherein the instructions to determine the likelihood of a dispute further comprise instructions that cause the processors to:
retrieve the current attributes data and the historic attributes data of the work item, wherein the historic attributes data includes attributes of bills that were disputed.

4. The robotic operations control system of claim 3, wherein the instructions to determine the likelihood of a dispute further comprise instructions that cause the processors to:
calculate a probability of occurrence of dispute for each attribute in the current attributes data based on occurrences of disputes for the attribute in the historic attributes data; and
compare the probability of occurrence of dispute for each attribute with a respective predetermined threshold.

5. The robotic operations control system of claim 4, wherein the instructions to provide the checklist further comprise instructions that cause the processor to:
automatically add a checkpoint for the attribute to the checklist if the probability of occurrence of dispute for the attribute is higher than the predetermined threshold.

6. The robotic operations control system of claim 1, wherein the type of billing request pertains to a change in options and the non-transitory data storage medium further comprises instructions that cause the processors to:
automatically determine from the billing request, attributes of the at least one work item associated with the matter to be billed to be added or deleted.

7. The robotic operations control system of claim 6, wherein the type of billing request pertains to the change in options and the non-transitory data storage medium further comprises instructions that cause the processors to:
extract the attributes from the billing request to a spreadsheet;
filter the spreadsheet based on types of options for each of the attributes; and
add or delete options as per request in the billing request.

8. The robotic operations control system of claim 1, wherein the type of billing request pertains to a change in the product and the non-transitory data storage medium further comprises instructions that cause the processors to:
automatically determine a product code to be updated based on the billing request; and
update the product code in the current attributes data of the at least one work item associated with the matter to be billed.

9. The robotic operations control system of claim 1, wherein the type of billing request pertains to a change in a rate, the non-transitory data storage medium further comprises instructions that cause the processors to:
automatically determine the rate to be updated;
confirm that a current rate is different from a new rate to be updated; and
update the new rate within the current attributes data.

10. The robotic operations control system of claim 1, wherein to enable processing of the dispute, the non-transitory data storage medium further comprises instructions that cause the processors to:
obtain files and extract data associated with the at least one work item associated with the collection matter from the files.

11. A method of enabling robotic operations by a robotic operations control system, comprising:
receiving current attributes data of a bill to be prepared;

accessing historic attributes data of the bill to be prepared, the historic attributes data including prior values from previous bills for each current attribute included in the bill;

determining a likelihood of occurrence of a dispute for each current attribute of the bill based on respective historic attributes data;

identifying at least a subset of current attributes of the bill that have respective likelihoods of occurrences of disputes higher than respective thresholds;

generating a checklist that includes respective checkpoints for the subset of the current attributes;

providing the checklist for verification of the bill to be prepared;

accessing, from an electronic mailbox, a plurality of work items associated with bills to be collected;

parsing and analyzing text from the plurality of work items;

obtaining current attributes data for each of the work items based on identify indicia of the work items extracted from the parsed text;

automatically assigning priorities to the work items based on the current attributes data, the priorities being selected from a plurality of priority levels;

obtaining information required for completing the work items based on the current attributes data;

identifying work items for collections matters and work items corresponding to disputes using the current attributes data of the work items;

automatically completing work items that are configured for execution by robotic processes;

flagging work items that are not configured for execution by robotic processes for manual input; and processing the work items corresponding to disputes to determine validity, invalidity or for query importing by the robotic operations control system having a plurality of robot assistants, emails from an email server into respective mailboxes associated with one or more of the plurality of robot assistants, wherein the emails include one or more work items that are to be assigned to a blended workforce, the blended workforce comprising one or more human employees and the plurality of robot assistants that include at least one of the processors and at least an intelligent billing assistant (iBA), an intelligent collection assistant (iNCA) and a disputes resolution assistant (DRA) wherein the iBA includes a dispute prediction model that estimates a likelihood of dispute in each newly created billing matter;

automatically forwarding the emails including the work items to one or more of the employees, wherein at least one of the work items includes at least two work items that further include at least a matter to be billed forwarded to the iBA and a collection matter forwarded to the iNCA, wherein for the at least one work item associated with the matter to be billed, causing the iBA to:

retrieve the emails associated with the work item;

parse the emails associated with the work item;

extract, by the iBA using natural language processing (NLP) techniques that include the parsing of the emails, current attributes including identifying indicia of the matter to be billed and a type of billing request from text of emails associated with the at least one work item associated with the matter to be billed;

analyze current attributes data and historic attributes data of the work item associated with the matter to be billed using the dispute prediction model;

determine a likelihood of a dispute based on the analysis;

automatically generate a checklist to an employee of the one or more human employees assigned to the at least one work item associated with the matter to be billed, the checklist comprising one or more of the current attributes of the matter to be confirmed by the employee in response to the likelihood of dispute being higher than a threshold value for the one or more current attributes;

wherein if the at least one work item associated with the matter to be billed pertains to one of a change in options, a product change and a rate change, causing the iBA to:

transmit the emails along with the identifying indicia for the at least one work item associated with the matter to be billed to the employee in response to an access request from the employee assigned to the at least one work item associated with the matter to be billed;

wherein for the at least one work item associated with the collection matter causing the iNCA to:

set a priority for the at least one work item associated with the collection matter relative to other work items associated with collection matters, the priority being based at least on the current attributes data and the historic attributes data of the work item;

retrieve pre-call information including one or more emails relevant to the at least one work item associated with the collection matter and the emails include the current attributes data for the work item associated with the collection matter that has been prioritized;

receive and store post-call information to the current attributes data for the at least one work item associated with the collection matter;

parse text of the at least one work item associated with the collection matter;

determine based on the parsing, if the text includes one or more of particular data fields and textual patterns indicative of a dispute;

wherein if the at least one work item associated with the collection matter is associated with the dispute:

retrieving the current attributes data including the post-call information and historic attributes data for the at least one work item associated with the collection matter;

receiving an input from the employee on whether or not a dispute is to be registered;

if a dispute is to be registered:

updating the current attributes of the at least one work item associated with the collection matter to register the dispute with the DRA;

enabling processing of the dispute by the DRA;

if the dispute is not registered:

receiving the employee's selection of a scenario, recipients and attachments for one of a query or rejection; and transmitting an email to a contact party associated with the dispute regarding the querying or the rejection of the dispute.

12. A non-transitory computer-readable storage medium comprising machine-readable instructions that cause a processor to:

import by a the robotic operations control system having a plurality of robot assistants, emails from an email server into respective mailboxes associated with one or more of the plurality of robot assistants, wherein the emails include at least one list of work items that are to be assigned to a blended workforce, the blended workforce comprising one or more human employees and the plurality of robot assistants that include at least one of the processors and at least an intelligent billing assistant (iBA), an intelligent collection assistant (iNCA) and a disputes resolution assistant (DRA) wherein the iBA includes a dispute prediction model that estimates a likelihood of dispute in each newly created billing matter;

automatically forward the emails including the work items to one or more of the employees, wherein at least one of the work items includes at least two work items that further include at least a matter to be billed forwarded to the iBA and a collection matter forwarded to the iNCA;

wherein for the at least one work item associated with the matter to be billed, causing the iBA to:

retrieve the emails associated with the work item;

parse the emails associated with the work item;

extract, by the iBA using natural language processing (NLP) techniques that include the parsing of the emails, current attributes including identifying indicia of the matter to be billed and a type of billing request from text of emails associated with the at least one work item associated with the matter to be billed;

analyze current attributes data and historic attributes data of the work item using a dispute prediction model;

determine a likelihood of a dispute based on the analysis;

automatically generate a checklist to an employee of the one or more human employees assigned to the at least one work item associated with the matter to be billed, the checklist comprising one or more of the current attributes of the matter to be confirmed by the employee in response to the likelihood of dispute being higher than a threshold value for each of the one or more current attributes;

wherein if the at least one work item associated with the matter to be billed pertains to one of a change in options, a product change or a rate change, causing the iBA to:

transmit the emails along with the identifying indicia for the at least one work item associated with the matter to be billed to an employee in response to an access request from the employee assigned to the at least one work item associated with the matter to be billed;

wherein for the at least one work item associated with the collection matter causing the iNCA to:

set a priority for the work item relative to other work items associated with collection matters, the priority being based at least on the current attributes data and the historic attributes data of the work item;

retrieve pre-call information including one or more emails relevant to the at least one work item associated with the collection matter and the emails include current attributes data for the work item associated with the collection matter that has been prioritized;

receive and store post-call information to the current attributes data for the at least one work item associated with the collection matter;

parse text of the at least one work item associated with the collection matter;

determine based on the parsing, if the text includes one or more of particular data fields and textual patterns indicative of a dispute wherein if the at least one work item associated with the collection matter is associated with the dispute:

retrieve the current attributes data including the post-call information and historic attributes data for the at least one work item associated with the collection matter;

receive an input from the employee on whether or not a dispute is to be registered;

if a dispute is to be registered:

update the current attributes of the at least one work item associated with the collection matter to register the dispute with the DRA;

enable processing of the dispute by the DRA;

if the dispute is not registered:

receive the employee's selection of a scenario, recipients and attachments for one of a query or rejection; and transmit an email to a contact party associated with the dispute regarding the querying or the rejection of the dispute.

13. The non-transitory computer-readable storage medium of claim 12, further comprising machine-readable instructions that cause a processor to:

automatically assign at least a subset of the work items to one or more members of the blended workforce based on a match between the current attribute data of the work items and data of the members as provided in a team matrix.

14. The non-transitory computer-readable storage medium of claim 12, further comprising machine-readable instructions that cause a processor to:

provide pre-made template emails that including language suitable to conditions of the dispute in response to the selection of the scenario.

* * * * *

UNITED STATES PATENT AND TRADEMARK OFFICE
CERTIFICATE OF CORRECTION

PATENT NO. : 11,074,528 B2
APPLICATION NO. : 15/783915
DATED : July 27, 2021
INVENTOR(S) : Kumar A. Gupta et al.

Page 1 of 1

It is certified that error appears in the above-identified patent and that said Letters Patent is hereby corrected as shown below:

In the Claims

In Column 22, Line 65, Claim 12, "a the" should read "a".

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*